US009128642B2

(12) United States Patent
Ota

(10) Patent No.: US 9,128,642 B2
(45) Date of Patent: Sep. 8, 2015

(54) SYSTEM AND CONTROL METHOD

(71) Applicant: CANON KABUSHIKI KAISHA, Tokyo (JP)

(72) Inventor: Shunsuke Ota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 13/673,774

(22) Filed: Nov. 9, 2012

(65) Prior Publication Data
US 2013/0125134 A1 May 16, 2013

(30) Foreign Application Priority Data

Nov. 16, 2011 (JP) ................................. 2011-250851

(51) Int. Cl.
*G06F 9/46* (2006.01)
*G06F 3/12* (2006.01)
*G06F 21/00* (2013.01)
*H04N 1/00* (2006.01)

(52) U.S. Cl.
CPC *G06F 3/12* (2013.01); *G06F 21/00* (2013.01); *H04N 1/00* (2013.01); *H04N 1/0023* (2013.01); *H04N 1/00225* (2013.01)

(58) Field of Classification Search
None
See application file for complete search history.

(56) References Cited

U.S. PATENT DOCUMENTS

| 8,533,283 B2 * | 9/2013 | Shuster ........................ 709/217 |
| 2006/0126110 A1 * | 6/2006 | Ohara et al. .................. 358/1.15 |
| 2006/0185021 A1 * | 8/2006 | Dujari et al. .................... 726/27 |
| 2007/0083649 A1 * | 4/2007 | Zuzga et al. .................. 709/224 |
| 2010/0171973 A1 * | 7/2010 | Kimura ......................... 358/1.14 |
| 2012/0050799 A1 | 3/2012 | Towata |

FOREIGN PATENT DOCUMENTS

| CN | 1770812 A | 5/2006 |
| CN | 101770351 A | 7/2010 |
| JP | 2009-223739 A | 10/2009 |

OTHER PUBLICATIONS

Disclosed Anonymously, Printer driver based job forwarding, an IP.com Prior Art Database Technical Disclosure, electronic publication, Jul. 6, 2011, 4 pages, IP.com No. IPCOM000208393D.

* cited by examiner

*Primary Examiner* — Sisley Kim
(74) *Attorney, Agent, or Firm* — Canon USA, Inc., IP Division

(57) ABSTRACT

If a specific task is to perform a process at the time of processing a specific job, the specific task performs a process specified in the specific task by accessing a third party system using a stored access token and receiving a third party service.

7 Claims, 32 Drawing Sheets

FIG.7

| USER ID | TICKET ID | ROUTE ID | PARAMETERS |
|---|---|---|---|
| user1 | 00001 | 001 | Width:100,Height:200,FolderPath:¥User¥user1¥ |
| user2 | 00002 | 002 | Uri:http://cloud1service1/document/<br>accessToken:abcdefghijklmnxxxxxxxxxxxxx,<br>expires_in:2011/12/31 12:00:00 |
| user1 | 00003 | 003 | |
| user3 | 00004 | 002 | |
| user4 | 00005 | 003 | Uri:http://cloud1service2/document/<br>accessToken:opqrstuvwxxxxxxxxxxxxxx,<br>expires_in:2011/1/1 12:00:00 |
| user5 | 00006 | 003 | |

FIG.8

| TEMPLATE ID | TEMPLATE NAME | ROUTE ID |
|---|---|---|
| 01 | SCAN To CLOUD 1 | 001 |
| 02 | SCAN To CLOUD 2 | 002 |
| 03 | JPEG To CLOUD 1 | 003 |

FIG.14

| ROUTE ID | SEQUENCE NUMBER | TASK | |
|---|---|---|---|
| 001 | 1 | Task9 | ~1411 |
| 001 | 2 | Task2 | ~1412 |
| 002 | 1 | Task1 | ~1413 |
| 002 | 2 | Task3 | ~1414 |
| 002 | 3 | Task5 | ~1415 |
| 002 | 4 | Task7 | ~1416 |
| 003 | 1 | Task2 | ~1417 |

FIG.15

| TASK ID 1302 1501 | TASK NAME 1502 | AUTHORIZATION URL 1503 |
|---|---|---|
| Task1 | PERFORM PDF To PDL CONVERSION | |
| Task2 | STORE IN CLOUD 1 | https://www.cloud1.co.jp/dialog/oauth |
| Task3 | COOPERATE WITH DATA CONVERSION SERVICE | |
| Task4 | STORE IN CLOUD 2 | https://www.cloud2.co.jp/dialog/oauth |
| Task5 | ACQUIRE DATA FROM CLOUD 1 | https://www.cloud1.co.jp/dialog/oauth |
| Task6 | PERFORM PDF To JPEG CONVERSION | |
| Task7 | STORE IN CLOUD 3 | https://www.cloud3.co.jp/dialog/oauth |
| Task8 | STORE SCANNED DATA | |
| Task9 | PERFORM IMAGE PROCESSING | |
| ... | | |

FIG.17

| JOB ID | ROUTE ID | FILE GROUP ID | CURRENT TASK ID | STATUS | LAST UPDATE DATE AND TIME | PARAMETERS |
|---|---|---|---|---|---|---|
| 1 | 001 | Job1 | Task9 | 0 | 2011/09/15 12:00:00 | Width:100,Height:200,FolderPath:¥User¥user1¥ |
| 2 | 002 | Job2 | Task1 | 0 | 2011/09/15 12:30:00 | Uri:http://cloud1service1/document/ accessToken:opqrstuvwxxxxxxxxxxxxxxxx, expires_in:2011/12/31 12:00:00 |
| 3 | 003 | Job3 | Task2 | 1 | 2011/09/15 13:00:00 | |
| 4 | 002 | Job4 | Task5 | 2 | 2011/09/15 12:40:00 | Uri:http://cloud1service2/document/ accessToken:opqrstuvwxxxxxxxxxxxxxxxx, expires_in:2011/1/1 12:00:00" |

FIG.20

| ID | HOST NAME | ACTIVE FLAG | SHARED FOLDER NAME |
|---|---|---|---|
| 01 | ServerA.host.co.jp | True | Shared |
| 02 | ServerB.host.co.jp | True | Shared |
| 03 | ServerC.host.co.jp | False | Shared |

...

| FILE ID | FILE GROUP ID | TASK ID | No | PATH | HOST NAME | CREATION DATE | EXPIRATION DATE |
|---|---|---|---|---|---|---|---|
| 001 | Job1 | Folder | 1 | \\ServerA\Job1 | ServerA | 2011/1/1 0:01 | 2011/1/8 0:01 |
| 002 | Job1 | Folder | 1 | \\ServerB\Job1 | ServerB | 2011/1/1 0:01 | 2011/1/8 0:01 |
| 003 | Job1 | init | 1 | \\ServerA\Job1\init\1.pdf | ServerA | 2011/1/1 0:02 | 2011/1/8 0:02 |
| 004 | Job1 | init | 1 | \\ServerB\Job1\init\2.pdf | ServerB | 2011/1/1 0:02 | 2011/1/8 0:02 |
| 005 | Job1 | Task1 | 1 | \\ServerA\Job1\Task1\1.pdf | ServerA | 2011/1/1 0:03 | 2011/1/8 0:03 |
| 006 | Job1 | Task1 | 2 | \\ServerA\Job1\Task1\2.pdf | ServerA | 2011/1/1 0:03 | 2011/1/8 0:03 |
| 007 | Job2 | Folder | 1 | \\ServerC\Job2 | ServerC | 2011/1/1 0:10 | 2011/1/8 0:10 |

...

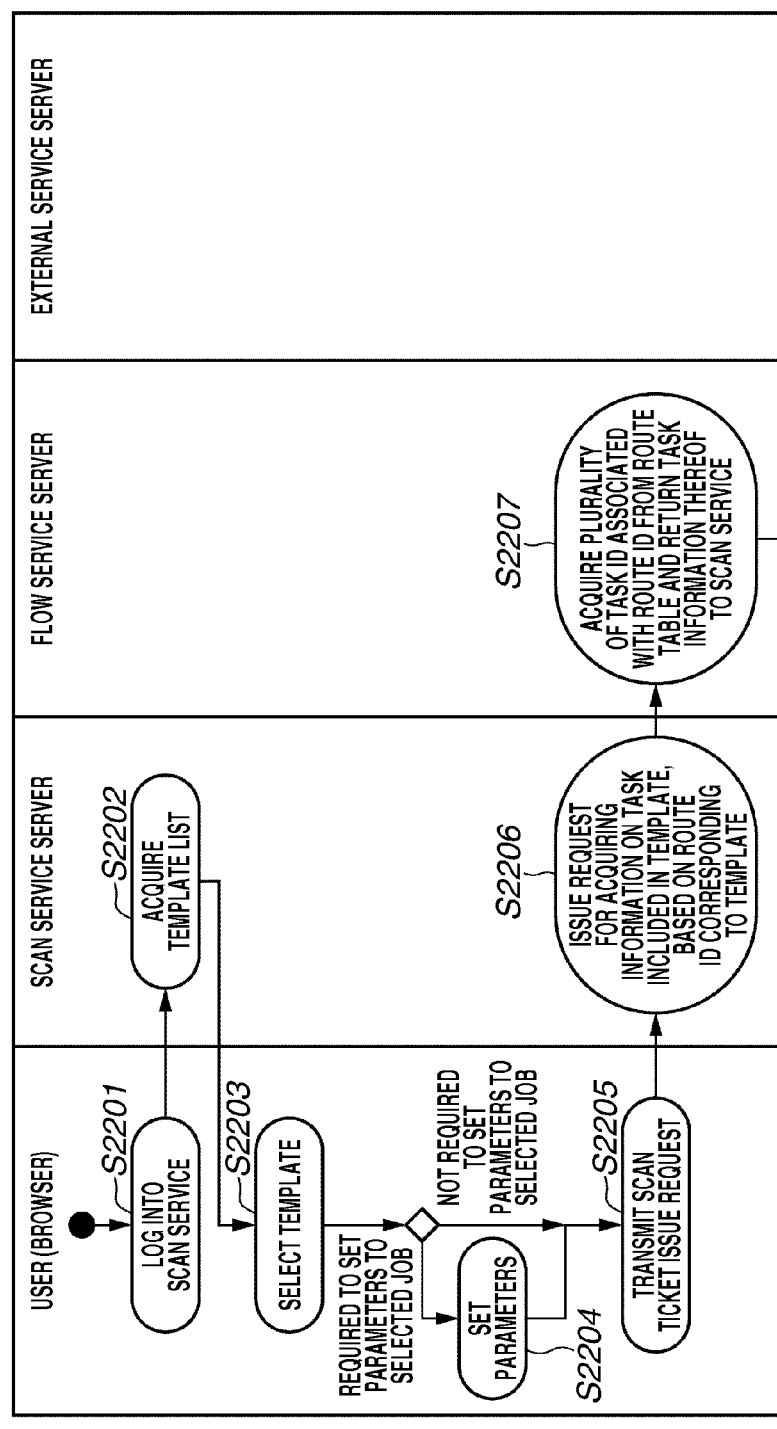

FIG.25

| USER ID | TICKET ID | ROUTE ID | PARAMETERS |
|---|---|---|---|
| user1 | 00001 | 001 | Width:100,Height;200,FolderPath:¥User¥user1¥ |
| user2 | 00002 | 002 | Uri:http://cloudlservice1/document/<br>accessToken:abcdefghijklmnxxxxxxxxxxxxxxx,<br>expires_in:2011/12/31 12:00:00 |
| user1 | 00003 | 003 | |
| user3 | 00004 | 002 | Uri:http://cloudlservice2/document/<br>accessToken:opqrstuvwxxxxxxxxxxxxxxxx,<br>expires_in:2011/1/1 12:00:00 |
| user4 | 00005 | 003 | |
| user5 | 00006 | 003 | |

| EXPIRATION DATE |
|---|
| 2011/10/15 12:30:00 |
| 2011/09/17 12:30:00 |
| 2011/09/18 12:30:00 |
| 2011/09/14 12:30:00 |
| 2011/09/15 12:30:00 |
| 2011/09/15 12:30:00 |

SYSTEM AND CONTROL METHOD

BACKGROUND OF THE INVENTION

1. Field of the Invention

The present invention relates to a system for processing a job and a control method and in particular, but not exclusively, for processing an imaging job in a cloud computing environment.

2. Description of the Related Art

Recently, techniques such as a cloud computing system and Software as a Service (SaaS) have come to be used in performing various processes on a server computer side. Cloud computing employs a large number of computing resources to perform distributed data conversion and data processing, so that requests from a number of clients can be processed at the same time. Further, there is a technique in which a series of processes to be performed on the server is realized by connecting tasks that are specified in detail and performing simultaneous parallel processing of the tasks. A plurality of jobs is thus scalably-processed, making full use of the characteristics of cloud computing. In such a process, it may become necessary to cooperate with an external web service that requires authentication and authorization, such as when submitting a document to a storage service.

Japanese Patent Application Laid-Open No. 2009-223739 discusses a technique for retrieving, when a user logs into the system, definition information of a data flow which is predefined. If there is an external service requiring authentication in the definition of the flow, and the authentication process has not yet been performed, a screen for logging into the external service is displayed, and a user is caused to input authentication information. As a result, the technique is capable of automatically performing the authentication process with respect to the external service to be used according to the predetermined flow.

SUMMARY OF THE INVENTION

According to an aspect of the present invention, a system for processing an imaging job by connecting a plurality of tasks, each of which performs a specified process, and sequentially executing each task, includes a transmission unit configured to, in a case where an instruction to generate a specific job requiring connection of a specific task that accesses a third party system providing a third party service is issued via a by the system, transmit a redirect instruction to access to the third party system, a storing unit configured to store an access token issued in response to an instruction received by the system from a user to permit access by the device to the system provided by the third party system specified by the redirect instruction, and an execution unit configured to execute a process specified in the specific task by accessing the third party system using the stored access token and using the third party service.

Further features and aspects of the present invention will become apparent from the following detailed description of embodiments with reference to the attached drawings.

BRIEF DESCRIPTION OF THE DRAWINGS

The accompanying drawings, which are incorporated in and constitute a part of the specification, illustrate embodiments, features, and aspects of the invention and, together with the description, serve to explain the principles of the invention.

FIG. 7 illustrates an example of ticket information stored in the scan service server according to an embodiment of the present invention.

FIG. 8 illustrates an example of templates stored in the scan service server according to an embodiment of the present invention.

FIG. 14 illustrates an example of route information stored in the route management service server according to an embodiment of the present invention.

FIG. 15 illustrates an example of task information stored in the route management service server according to an embodiment of the present invention.

FIG. 17 illustrates an example of job information stored in the job management service server according to an embodiment of the present invention.

FIG. 20 illustrates an example of file server information and file path information stored in the central management server according to an embodiment of the present invention.

FIG. 25 illustrates an example of ticket information stored in a scan service server according to a second embodiment of the present invention.

DESCRIPTION OF THE EMBODIMENTS

Various embodiments, features, and aspects of the invention will be described in detail below with reference to the drawings.

Figure 1:
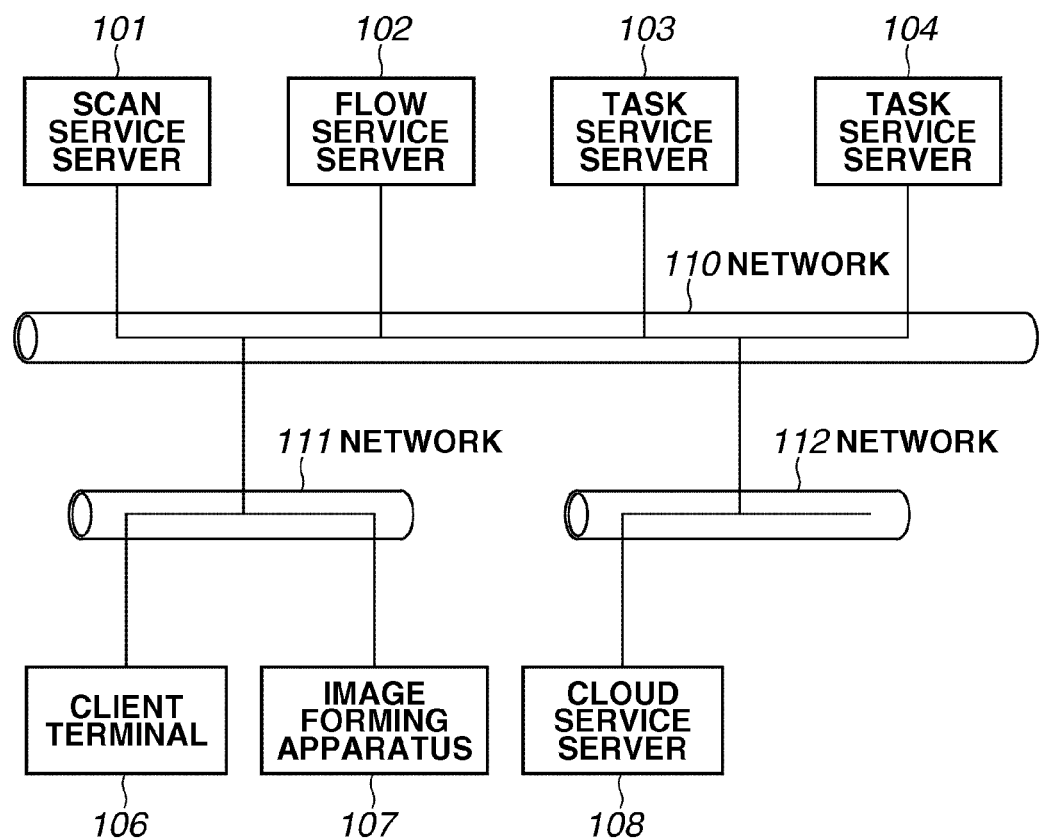
FIG. 1 illustrates an entire configuration of the cloud system according to an embodiment of the present invention.

FIG. 1 illustrates an entire configuration of a cloud system according to a first embodiment of the present invention. Referring to FIG. 1, a scan service server 101, a flow service server 102, task service servers 103 and 104, a client terminal 106, an image forming apparatus 107, and a cloud service server 108 are connected via networks 110, 111, and 112.

It is assumed that a plurality of task service servers 103 and 104, client terminals 106, image forming apparatuses 107, and cloud service servers 108 are connected. The networks 110, 111, and 112 are local area networks (LAN) such as the Internet, a wide area network (WAN), a telephone line, a dedicated digital line, an asynchronous transfer mode (ATM) or a frame relay line, a group television line, a wireless line for data broadcasting, or a combination of such networks. In other words, the networks 110, 111, and 112 are communication networks, and may be any type of network as long as data can be transmitted and received.

In a typical cloud computing service, the networks 110 and 112 are the Internet, and the network 111 is an in-house network or the network of a service provider. The scan service server 101, the flow service server 102, and the task service servers 103 and 104 are usually executed on the server computer, and such service server group provides the cloud service to the user. Each of the task service servers 103 and 104 include functions for executing the processes specified thereto.

Further, various companies have made the cloud service server 108 available on the Internet, and the cloud service server is also generally executed on the server computer. According to this embodiment of the present invention, each server is described as a "service". The client terminal 106, such as a desktop personal computer (PC), a note PC, a mobile PC, or a personal data assistant (PDA), may also be a cellular phone which includes an execution environment of programs. The client terminal 106 includes the environment for executing the programs such as a web browser (i.e., an Internet browser, a world wide web (WWW) browser, and a browser for using the world wide web).

According to the present embodiment, the system including a plurality of server groups provides the cloud service. However, the server groups may be consolidated into one server. Further, the cloud service performs job processing in response to receiving an execution request from the client terminal corresponding to the device, by connecting the plurality of task service servers (i.e., by connecting the tasks) that perform the specified tasks. Each task sequentially executes and stores the data processes for processing the job. In other words, job generation originates in the device, and the system performs the job by sequentially executing the tasks.

According to the present embodiment, a job is generated when the device transmits an execution request. However, job generation timing may be the timing at which the user, for example, selects a generated scan ticket (i.e. specifying a scanning job having specified settings). The job generation timing can be arbitrarily determined, as long as the generated job is processed according to the device transmitting the execution request to the cloud service for all cases. In the specification, a scan job is described as an example. However, the present embodiment is applicable to another image processing job, such as a facsimile job, and also applicable to a job other than the image processing, such as a text editing job and a music editing job.

Figure 2:
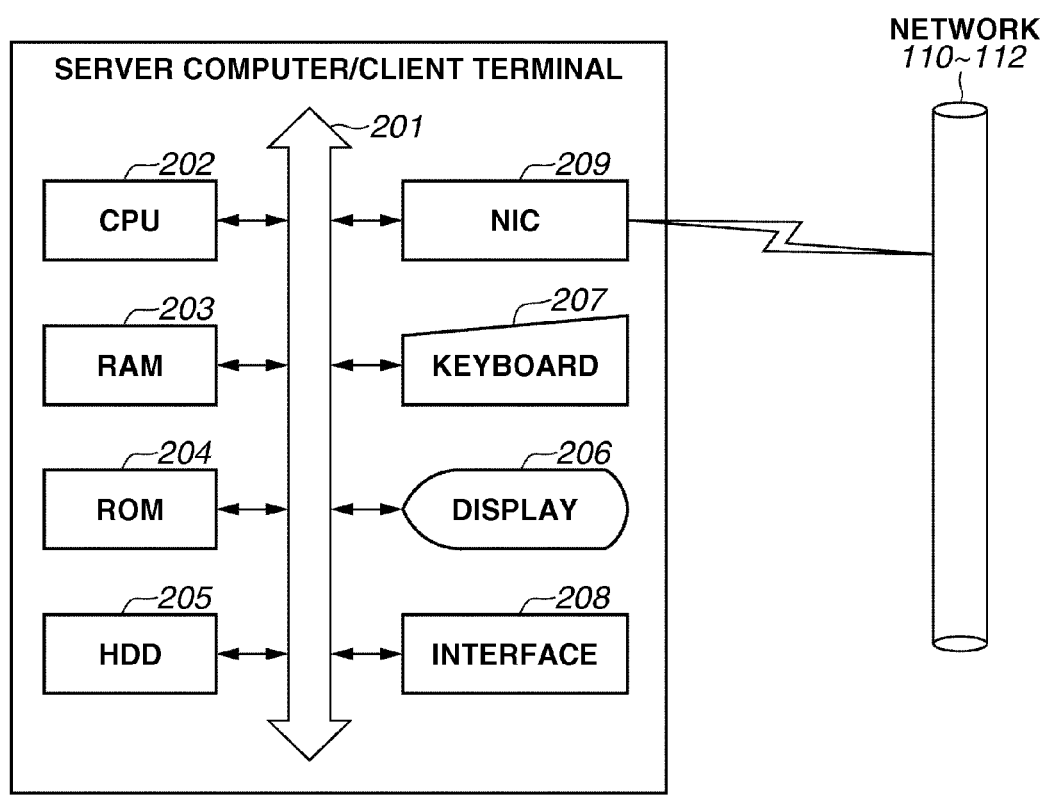
FIG. 2 illustrates a hardware configuration of a client terminal and a server computer according to an embodiment of the present invention.

FIG. 2 illustrates a hardware configuration of the server computer which realizes the client terminal 106 and the service group 101, 102, 103, and 104 according to this embodiment of the present invention. Referring to FIG. 2, a central processing unit (CPU) 202 performs control of the entire apparatus. The CPU 202 executes application programs and an operation system (OS) stored in a hard disk (HDD) 205, and performs control to temporarily store in a random access memory (RAM) 203 the information and files necessary for executing the programs. A read-only memory (ROM) 204 is a storing unit which stores various data pieces for a basic input/output (I/O) program or the like. The RAM 203 is a temporary storing unit, and functions as a main memory, a work area, and the like of the CPU 202. The HDD 205 is one of external storing units which functions as a large-capacity memory and stores the application programs of the web browser or the like, the programs of the service groups, the OS, and related programs. A display 206 is a display unit which displays commands input using a keyboard 207.

An interface 208 is an external device interface (I/F) for connecting the apparatus to a printer, a universal serial bus (USB) device, and a peripheral device. The keyboard 207 is an instruction input unit. A system bus 201 controls data flow in the apparatus. A network interface card (NIC) 209 exchanges data between external devices via the interface 208 and the networks 110, 111, and 112. The above-described configuration of the computer is an example and is not limited to the one illustrated in FIG. 2. For example, the data and the programs may also be stored in the ROM 204, the RAM 203, or the HDD 205 according to features thereof.

Figure 3:
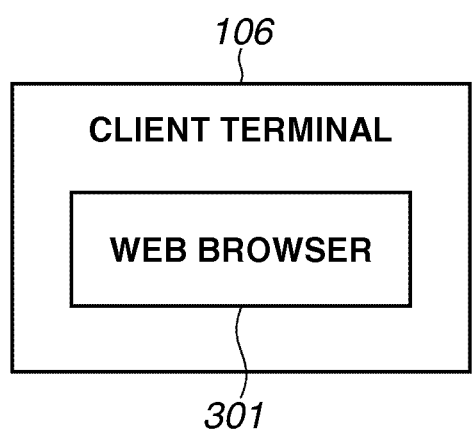
FIG. 3 illustrates a system configuration of the client terminal according to an embodiment of the present invention.

FIG. 3 illustrates the system configuration of the client terminal 106 according to this embodiment of the present invention. Referring to FIG. 3, a web browser 301 transmits a request to a web application provided by the scan service server 101 and displays the response. The user uses the cloud service employing the web browser 301 in the client terminal 106. The web browser 301 is realized by the CPU 202 executing the web browser program.

Figure 4:
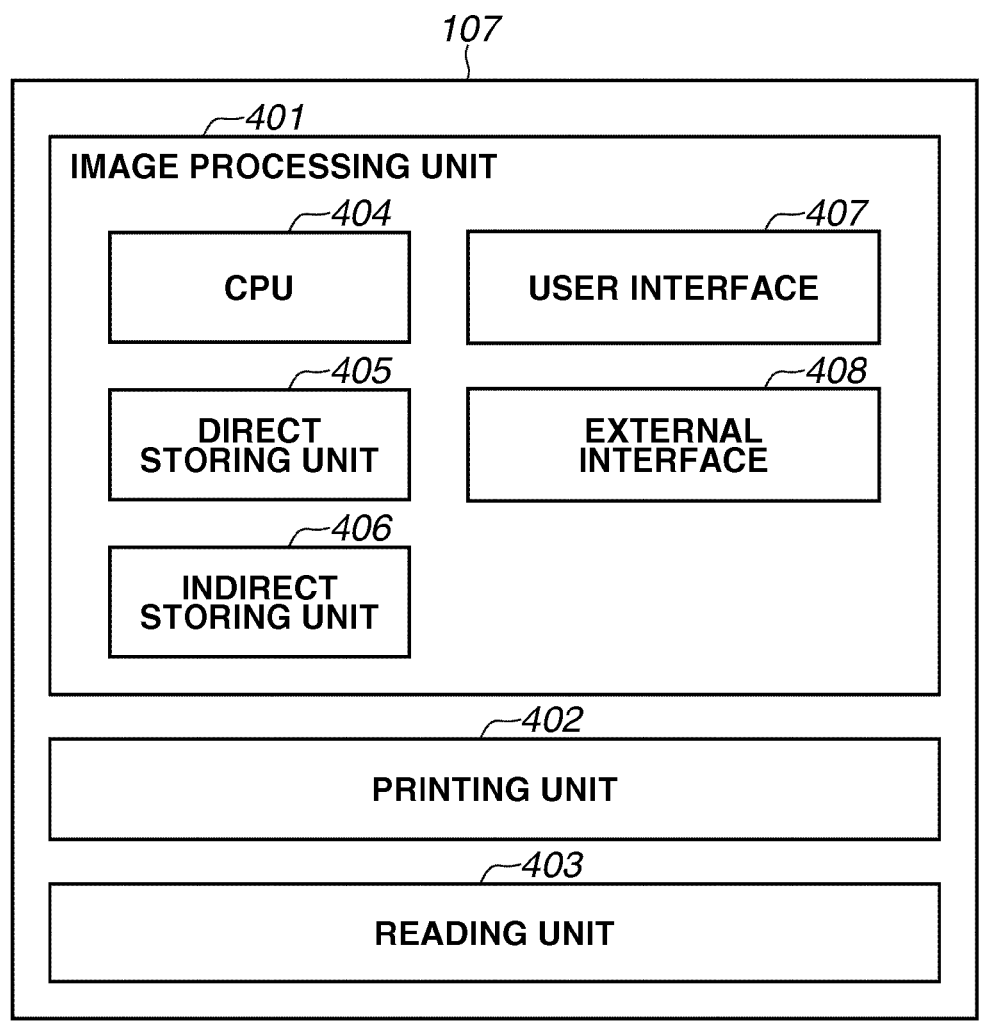
FIG. 4 illustrates in detail an internal configuration of an image forming apparatus according to an embodiment of the present invention.

FIG. 4 illustrates an internal configuration of the image forming apparatus 107 according to this embodiment of the present invention. According to the present embodiment, the image forming apparatus 107 includes both a scan function and a print function. However, a scan service may be realized by a scan-only apparatus not including the print function. Referring to FIG. 4, the image forming apparatus 107 includes an image processing unit 401, a printing unit 402, and a reading unit 403. The image processing unit 401 includes a CPU 404, a direct storing unit 405, an indirect storing unit 406, a user interface 407, and an external interface 408.

The CPU 404 executes predetermined programs and instructs various types of control performed in the image forming apparatus 107. The direct storing unit 405 is the work memory used by the CPU 404 when executing the programs loaded in the direct storing unit 405. The direct storing unit 405 is realized by the RAM. The indirect storing unit 406 stores various programs including the application programs and platform programs. The various programs stored in the indirect storing unit 406 are transferred to the direct storing unit 405 when the CPU 404 executes the programs. The indirect storing unit 406 is realized by a solid state drive (SSD) or the HDD. The CPU 404 may be a multiprocessor.

The platform will be described in detail below. When the platform is realized, the user can execute on the image forming apparatus 107 a new application that the user has developed, and customize an operation screen of the image forming apparatus 107. The method for realizing the platform will be described below. The CPU 404 transfers a platform program (e.g. written in Java (registered trademark)) stored in the indirect storing unit 406 to the direct storing unit 405. Upon completing the transfer, the CPU 404 is in a state capable of executing the platform program. Execution of the platform program by the CPU 404 is referred to as activation of the platform. The platform operates on firmware in the image forming apparatus 107. The platform program provides an environment for executing an object-oriented application program.

The method for executing the application program on the platform will be described in detail below. According to this embodiment of the present invention, scan software for transmitting a scanned image to the cloud service is running on the platform. The scan software receives a list of the scan tickets from the scan service server 101 connected via the network using a communication protocol such as hypertext transfer protocol (HTTP). The scan ticket stores information such as settings for performing scanning and a subsequent process flow. Hereinafter, a software unit realized by executing the scan software will be referred to as a scan software unit.

The user selects a scan ticket from a scan ticket list displayed by the scan software unit, and uses a scanner unit to read a document. The user can thus complete scanning. The scan software unit transmits to the scan service server 101 the information of the scan ticket selected by the user and the scanned image data. Accordingly, the image forming apparatus 107 can be controlled by executing the application program on the platform.

The method for executing the application program will be described below. The activated platform transfers the application program stored in the indirect storing unit 406 to the direct storing unit 405. Upon completing the transfer, the platform is in a state capable of executing the application program. Thus, the platform executes the application program. Such a function in the platform which can be provided by executing the application program will be referred to herein as a platform application. Further, the platform is capable of performing a portion of the processes illustrated in the flowcharts.

The user interface 407 is a unit necessary for receiving a processing request from the user. For example, the user interface 407 receives a signal corresponding to an instruction input by the user via the keyboard or a mouse. The external interface 408 is capable of transmitting and receiving data to and from the external device. The external device may include an external storage device such as an external HDD or an external USB memory, and a separate apparatus such as a separate host computer or a separate image forming apparatus connected via the network. The image forming apparatus 107 can communicate with the client terminal 106 and the scan service server 101 via the networks 110 and 111. The services performed by the scan service server 101 and the task services 103 and 104 which provide the cloud service will be described below. In addition, the scanning process will be described below along with the description of the services with reference to a sequence diagram of the scanning process illustrated in FIG. 11.

Figure 5:
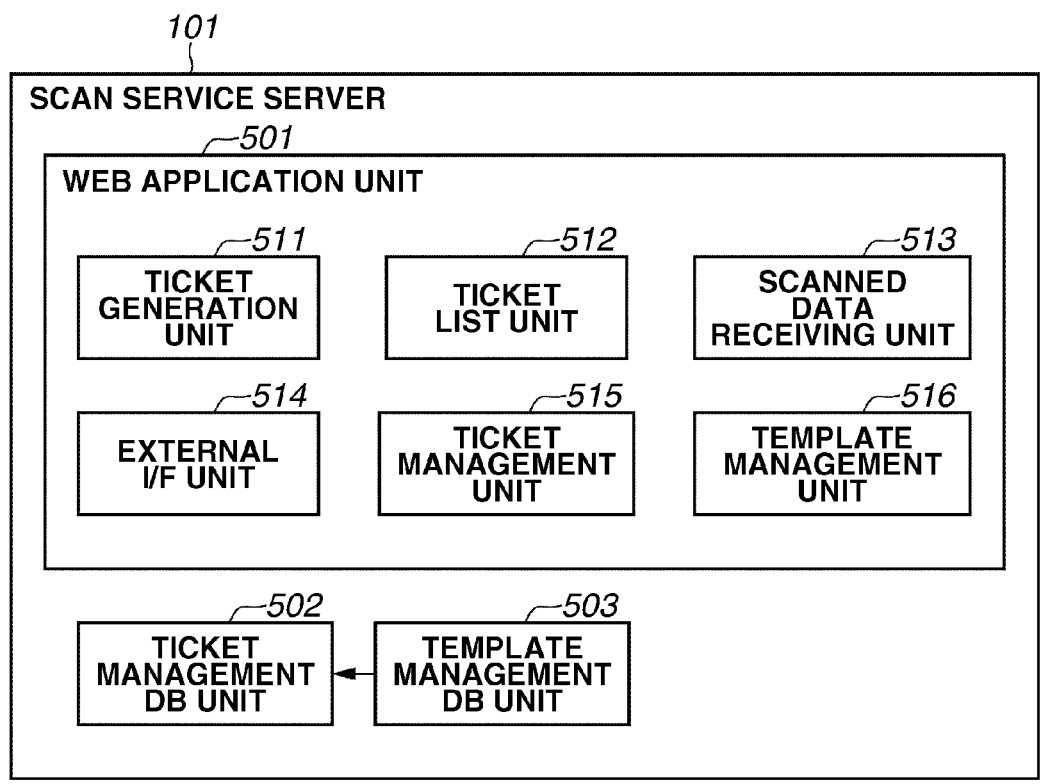
FIG. 5 illustrates a system configuration of a scan service server according to an embodiment of the present invention.

The scan service server 101 will be described below with reference to FIG. 5. The scan service server 101 is a service which provides the scan function in the cloud service. FIG. 5 illustrates the system configuration of the scan service server 101 according to this embodiment of the present invention. Referring to FIG. 5, the scan service server 101 includes a web application unit 501, a ticket management database (DB) unit 502, and a template management DB unit 503. The scan service server 101 is provided to the user by each of the above-described components executing the various processes. The web application unit 501 provides the application program that realizes the scan function. A ticket generation unit 511 realizes a series of functions for the user to generate a scan ticket. The scan settings for the image forming apparatus 107 to scan a document, the definition of the subsequent process flow, and parameters of the tasks to be performed in each process flow are recorded in the scan ticket.

Figure 6:
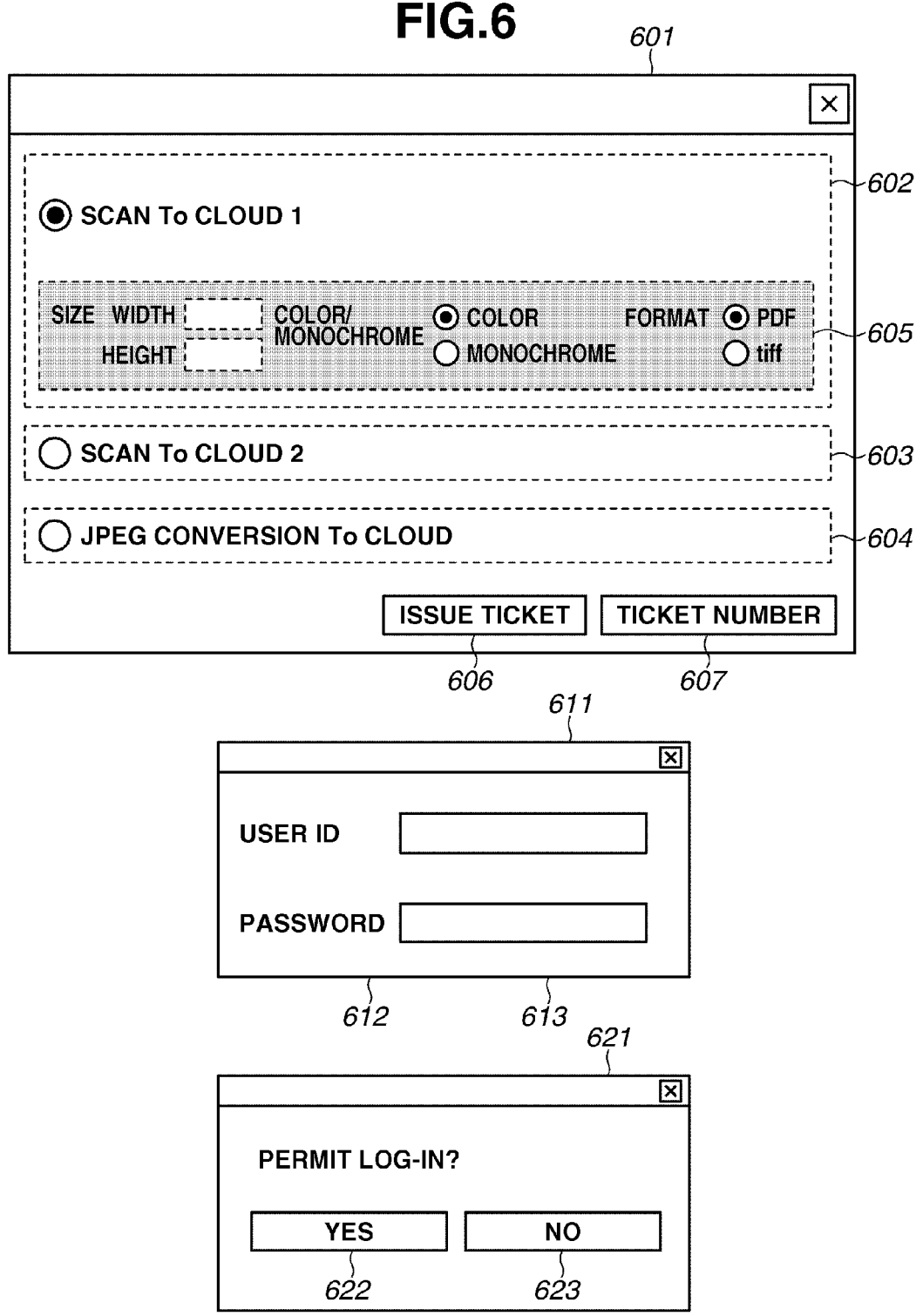
FIG. 6 illustrates an example of a user interface of the scan service server according to an embodiment of the present invention.
Figure 11:
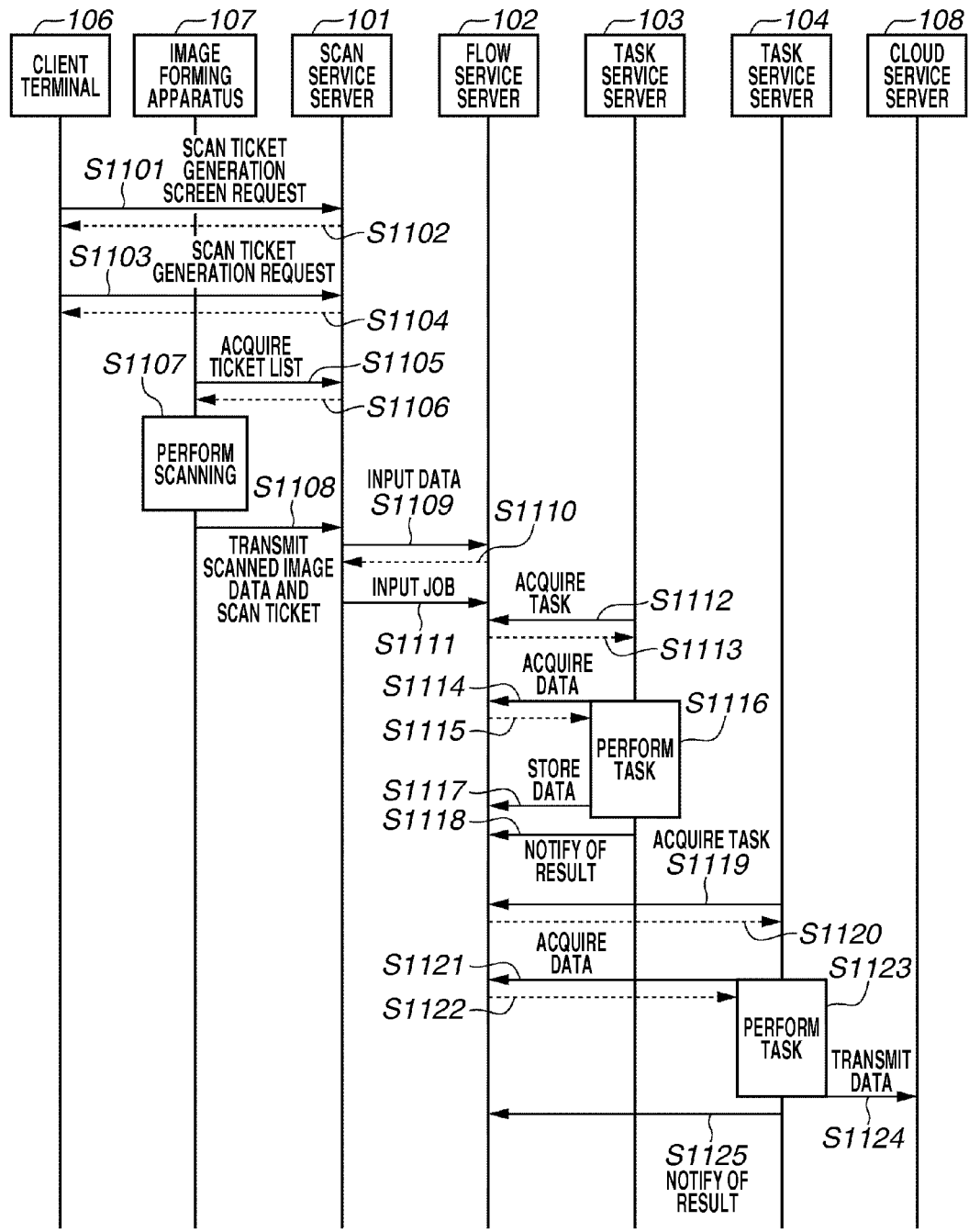
FIG. 11 is a sequence diagram illustrating a scanning process according to an embodiment of the present invention.

Referring to FIG. 11, in step S1101, the ticket generation unit 511 receives from the web browser 301 in the client terminal 106 a scan ticket generation screen request. In step S1102, the ticket generation unit 511 generates the scan ticket generation screen and responds to the client terminal 106. More specifically, the ticket generation unit 511 acquires from a template management unit 516, templates of the scan ticket registered in the template management DB unit 503. The ticket generation unit 511 then displays template names included in the acquired templates on the web browser 301 in the client terminal 106. FIG. 8 illustrates detail contents of the template management DB unit 503, and the templates will also be described below with reference to FIG. 8. Further, FIG. 6 illustrates an example of a screen displaying the template names which will be described below.

In step S1103, the user operates on the web browser 301 in the client terminal 106 and executes a scan ticket generation request, so that the scan ticket is generated and stored in a ticket management unit 515. The ticket management unit 515 receives a request to store the ticket, and thus stores the ticket information in the ticket management DB unit 502. FIG. 7 illustrates detail contents of the ticket management DB unit 502 which will be described below. In step S1104, the ticket management unit 515 stores the ticket information and then issues a response to the client terminal 106.

Figure 9:
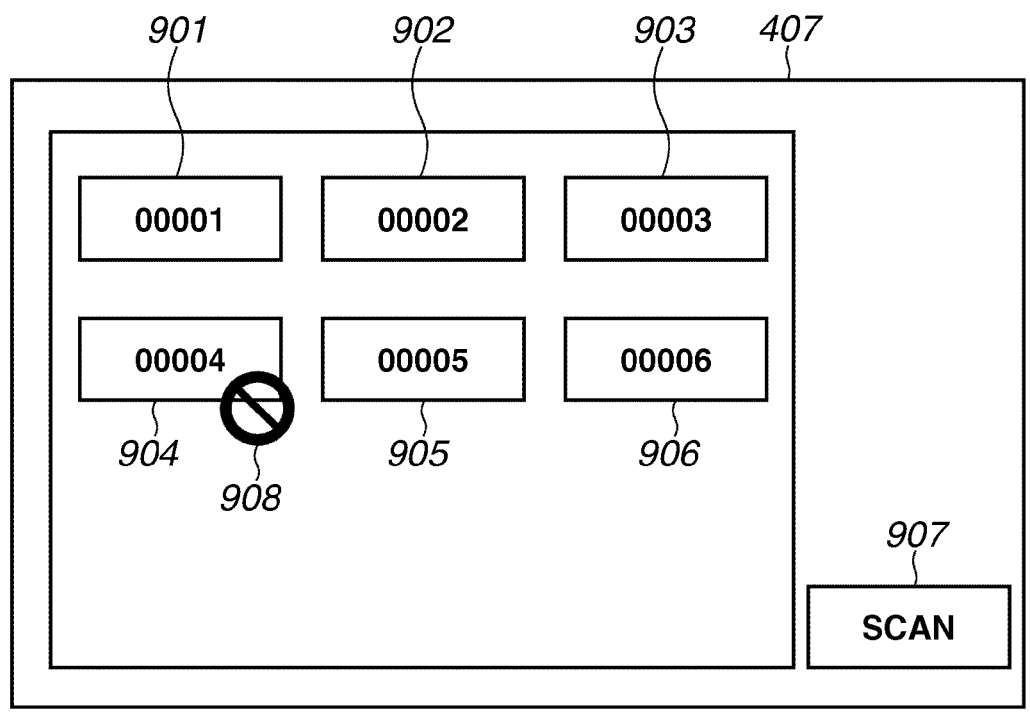
FIG. 9 illustrates an example of the user interface of the image forming apparatus according to an embodiment of the present invention.

An external I/F unit 514 communicates with the scan software unit which runs on the image forming apparatus 107. The scan software unit accesses via the external I/F unit 514 the functions of a ticket list unit 512 and a scanned data receiving unit 513. In step S1105 illustrated in FIG. 11, the scan software unit in the image forming apparatus 107 acquires from the ticket list unit 512 via the external I/F unit 514 the ticket list. The ticket list unit 512 generates a scan ticket list using the ticket management unit 515. In step S1106, the ticket list unit 512 returns a response to the scan software unit. Upon receiving the response, the image forming apparatus 107 displays on the user interface 407 illustrated in FIG. 4 the acquired ticket list. FIG. 9 illustrates an example of the display screen which will be described below.

In step S1107, the image forming apparatus 107 performs the scanning process. More specifically, the user selects one of the tickets displayed on the user interface 407, sets sheets on the scanner unit (i.e., a scanner apparatus) attached to the image forming apparatus 107, and performs scanning. Accordingly, in step S1108, the scan software unit transmits to the scanned data receiving unit 513 via the external I/F unit 514 the scanned image data acquired by performing scanning and the scan ticket.

The scanned data receiving unit 513 receives the transmitted scan ticket and the image data. In step S1109, the scanned data receiving unit 513 inputs the received image data to the flow service server 102. If the flow service server 102 correctly receives the image data, the flow service server 102 transmits identification (ID) which uniquely indicates the image data (i.e., a file group ID) to the scan service server 101 as a response. In step S1111, the scanned data receiving unit 513 then transmits to the flow service server 102 the file group ID and the scan ticket, i.e., inputs the job. The system configuration of the scan service server 101 and the process performed for submitting the scan job are as described above.

A ticket generation screen 601 will be described below with reference to FIG. 6. Referring to FIG. 6, the ticket generation screen 601 displays templates (602, 603, and 604) acquired from the template management DB unit 503 illustrated in FIG. 5. The templates correspond to the ticket templates. The user selects from the displayed templates the template used for executing the job processing. Upon the user selecting the template, a screen 605 is displayed for specifying the detailed ticket settings. FIG. 6 illustrates the detailed setting screen 605 displayed on the same screen. However, the detailed setting screen 605 may be displayed on a separate window.

The user can specify on the detailed setting screen 605 the scan settings according to the selected template. For example, the scan setting includes size, color or monochrome, and scanned data format settings as illustrated in FIG. 6. If the user presses a ticket issue button 606 after specifying the detailed settings, the ticket information is newly generated in the ticket management DB unit 502 illustrated in FIG. 5. The ticket information stored in the ticket management DB unit 502 will be described in detail below. If the ticket information is correctly generated in the ticket management DB unit 502, the ID uniquely assigned to the ticket is displayed in a ticket number box 607. The assigned ID is the same number as a ticket ID 702 illustrated in FIG. 7. The user memorizes the ID displayed on the ticket number box 607 and shifts to the image forming apparatus 107. According to the present embodiment, the timing at which the job is generated is defined as the time at which the user selected the ticket template and input the parameters of the scan settings, and the scan service server 101 receives the parameters.

A case where the task service server that requires authentication and authorization to be performed for cooperating with the external service is to be used in a route corresponding to the template selected by the user will be described below. When the user presses the ticket issue button 606 on the ticket generation screen 601, the ticket generation screen 601 determines as follows. The ticket generation screen 601 determines whether there is a task in the task information corresponding to the tasks included in the selected template, which requires authentication and authorization to be performed for cooperating with the external service.

The external service corresponds to a third party service, and a system providing the third party service corresponds to a third party system. Further, a specific task corresponds to the task that requires authentication and authorization to be performed for cooperating with the external service. The ticket generation screen may be a screen for generating the work flow. In other words, the user selects the task to be executed from the plurality of tasks and designates connection of the tasks on the generation screen. If the user selects the specific task in selecting the tasks, a redirect instruction to the third party service is issued. As described above, there is no limitation on the screen for generating the job, and according to this embodiment of the present invention, the screen for generating the job, i.e., the ticket, will be referred to as the generation screen.

A job which requires connection of the specific task in the job processing corresponds to a specific job. The job is generated based on a job processing instruction issued from the device. If there is a specific task which cooperates with the external service, a uniform resource locator (URL) for acquiring an authentication screen provided by the external service and a redirect instruction for accessing the URL are transmitted. Such an authentication screen 611 is a screen for the user to input a user ID 612 and a password 613 of the external service. When the user inputs the user ID and the password and authentication of the external service is completed, a dialog 621 inquiring whether to permit access from the scan service server 101 is displayed on a panel of the device. The dialog 621 is the authorization screen, and if the user selects "YES" 622 on the screen, the scan service server 101 acquires an access token for using the external service.

The ticket management 515 stores the access token in the ticket management DB unit 502 when the ticket management unit 515 stores the ticket information in the ticket management DB unit 502. The task service server can access the external service using the access token. The authorization screen corresponds to the authentication screen for inquiring whether to permit access from the task service server, provided by the third party system to the device which is accessing based on the redirect instruction. When the specific task is to be executed, processing of the specific job is smoothly completed by storing the access token.

FIG. 7 illustrates an example of information pieces managed in the ticket management DB unit 502. Referring to FIG. 7, a user ID 701 is an ID for uniquely indicating the user who generated the ticket. The ticket ID 702 is an ID uniquely defining the ticket. The ticket ID is generated when the user presses the ticket issue button 606 illustrated in FIG. 6, and is stored in the ticket management DB unit 502. A route ID 703 is a route ID corresponding to the template selected by the user on the ticket generation screen 601. If the user selects a ticket and the scanning process is performed, the scanned data is processed in an order of the tasks defined in the route ID 703. Parameters 704 record the scan settings specified on the detailed setting screen 605. If the authorization process is performed on the screen 621 illustrated in FIG. 6, the acquired access token and an expiration date of the access token are recorded in the parameters 704.

In FIG. 7, the access token is stored in the parameters 704 as a group in which a character string "accessToken" is the key. The expiration date is similarly stored in the parameters 704 as the character string in which "expires_in" is the key. The job, i.e., the ticket, generated via the generation screen is thus managed associated with the stored access token. The specific task which requires the access token identifies the access token associated with the ticket, and executes the specified process using the access token.

FIG. 8 illustrates an example of the templates managed by the template management DB unit 503. The template management DB unit 503 is a database for associating route information managed by a route information management DB unit 1301 illustrated in FIG. 13 with the templates displayed on the ticket generation screen. Referring to FIG. 8, the template includes a template ID 801, a template name 802, and a route ID 803. The template ID 801 is an ID uniquely indicating each template. The template name 802 is the name displayed on the ticket generation screen 601 illustrated in FIG. 6. The route ID 803 indicates an external key to a route ID 1401 illustrated in FIG. 14 managed by the route information management DB unit 1301.

FIG. 9 illustrates an example of the screen for displaying the ticket information acquired when the ticket list is acquired in step S1105 illustrated in FIG. 11. The screen is displayed on the user interface 407 of the image forming apparatus 107. Referring to FIG. 9, the screen displays the ticket ID 702 (901 to 906) acquired from the ticket management DB unit 502. The user selects the ticket to be executed, sets sheets to be scanned on the image forming apparatus 107, and presses a scan button 907. Accordingly, the scanned image data and the scan ticket are transmitted as in step S1108 illustrated in FIG. 11. By performing the scan transmission process in step S1108, the image forming apparatus 107 transmits the scanned image data and the ticket to the scanned data receiving unit 513 in the scan service server 101.

In addition, if the above-described access token in the ticket has expired, a symbol 908 indicating that the expiration date has passed is displayed on top of the ticket. Accordingly, the user can recognize that the access token to be used in the ticket has expired, so that user experience can be improved. The ticket list screen in FIG. 9 corresponds to a job selection screen. Since the task for processing the job corresponding to a ticket is executed by the user selecting the ticket, the screen is referred to as the job selection screen.

Figure 10:
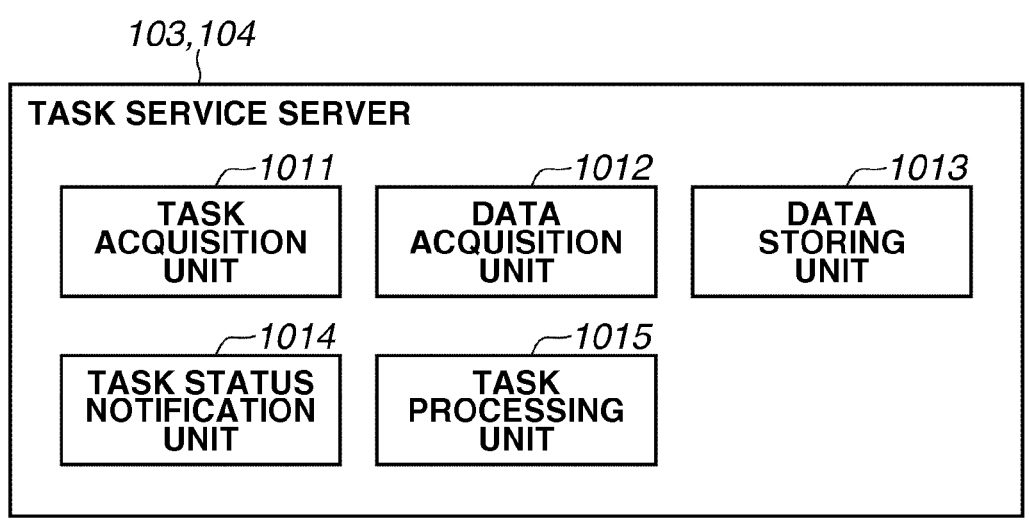
FIG. 10 illustrates a system configuration of a task service server according to an embodiment of the present invention.

FIG. 10 illustrates the system configuration of the task service servers 103 and 104 according to this embodiment of the present invention. Each task service server realizes elemental functions for providing the scan service. For example, there is a task service server which performs image processing on the scanned image data, and a task service server which transmits the image data to other cloud service 108 providing a file sharing function. According to the present embodiment, the task service server 103 performs image processing, and the task service server 104 performs the transmission task.

Each of the elements will be described below with reference to the sequence diagram illustrating the scanning process in FIG. 11. Referring to FIG. 11, in step S1112, step S1113, step S1119, and step S1120, a task acquisition unit 1011 illustrated in FIG. 10 in the task service servers 103 and 104 regularly inquires the flow service server 102 and acquires the respective tasks that can be processed by the task service servers 103 and 104. In step S1114, step S1115, step S1121, and step S1122, a data acquisition unit 1012 in the task service servers 103 and 104 acquires from the flow service server 102 the image data to be processed, based on the information acquired by the task acquisition unit 1011.

In step S1116 and step S1123, a task processing unit 1015 in the task service servers 103 and 104 performs various processes on the acquired image data. In step S1117, the task processing unit 1015 in the task service server 103 stores the processing result of step S1116 in the flow service server 102 via a data storing unit 1013. In step S1124, the task processing unit 1015 in the task service server 104 transmits to the cloud service 108 the data of the processing result of step S1123. In step S1118 and step S1125, a task status notification unit 1014 in the task service servers 103 and 104 notifies the flow service server 102 of the result of completing the series of tasks. The scan job is thus completed.

Figure 12:
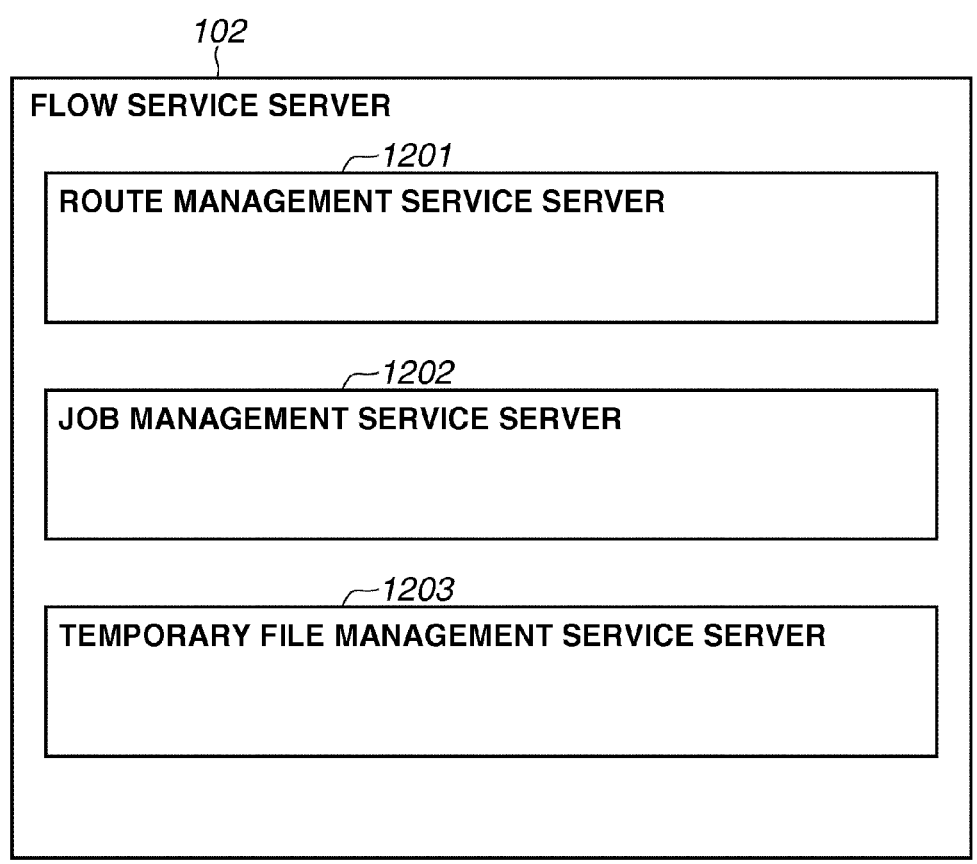
FIG. 12 illustrates a system configuration of a flow service server according to an embodiment of the present invention.

The flow service server 102 will be described in detail below. According to this embodiment of the present invention, the flow service server 102 is a main service which performs route management, job management, and temporary file management. FIG. 12 illustrates the system configuration of the flow service server 102. Referring to FIG. 12, the flow service server 102 includes a route management service server 1201, a job management service server 1202, and a temporary file management service server 1203. Each of the services is provided by the servers executing the various processes, and the flow services server 102 is provided to the user by the services cooperating with each other.

The route management service server 1201 manages the information on the routes in which the tasks are connected. The job management service server 1202 manages job processing based on the route information. The temporary file management service server 1203 manages storing of the data when the job is input and the data of the processing result of each task. The route management service server 1201, the job management service server 1202, and the temporary file management service server 1203 included in the flow service server 102 will be described in detail below. The flow service server 102 may also singularly realize the functions of the service servers 1201, 1202, and 1203.

Figure 13:
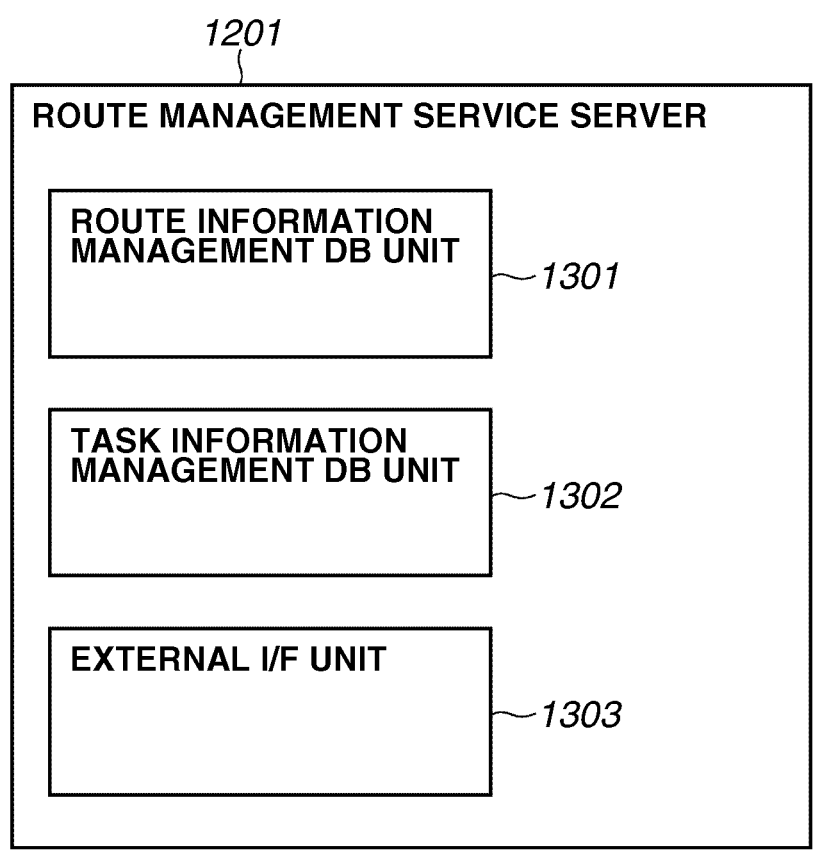
FIG. 13 illustrates a system configuration of a route management service server according to an embodiment of the present invention.

FIG. 13 illustrates the system configuration of the route management service server 1201. Referring to FIG. 13, the route management service server 1201 includes the route information management DB unit 1301, a task information management DB unit 1302, and an external I/F unit 1303. The route information management DB unit 1301 stores the information for defining the connection of the tasks in units of routes. The task information management DB unit 1302 defines each process in units of tasks, and stores the information about the tasks. The external I/F unit 1303 is an interface for inquiring the route management service server 1201, and is used by the job management service server 1202 to refer to the route information management DB unit 1301 and the task information management DB unit 1302.

FIG. 14 illustrates an example of the information pieces managed in the route information management DB unit 1301. Referring to FIG. 14, a route ID 1401 is an ID uniquely identifying the route. A sequence number 1402 stores the number of the task in the route at which the task is to be executed. A task ID 1403 stores the task to be executed. In FIG. 14, for example, a route whose route ID 1401 is "002" is defined by data pieces 1413, 1414, and 1415. The data 1413 is the first task to be executed, and the task whose task ID 1403 is "Task1" is executed. Similarly, the data 1414 is the second task with the task ID "Task3" to be executed, and the data 1415 is the third task with the task ID "Task5" to be executed.

FIG. 15 illustrates an example of the information pieces managed in the task information management DB unit 1302. Referring to FIG. 15, a task ID 1501 is an ID uniquely identifying the task. A task name 1502 indicates the name of the task. An authorization URL 1503 stores an address at which the web service is publicized for acquiring the authorization information from the external service with which the task is to cooperate. As described above, if the authorization URL 1503 is specified in the task included in the template selected on the ticket generation screen 601 illustrated in FIG. 6, the device is redirected to the URL when the user presses the ticket issue button 606. As a result, the device can access the authorization URL, and start the process to display the authorization screen.

Figure 16:
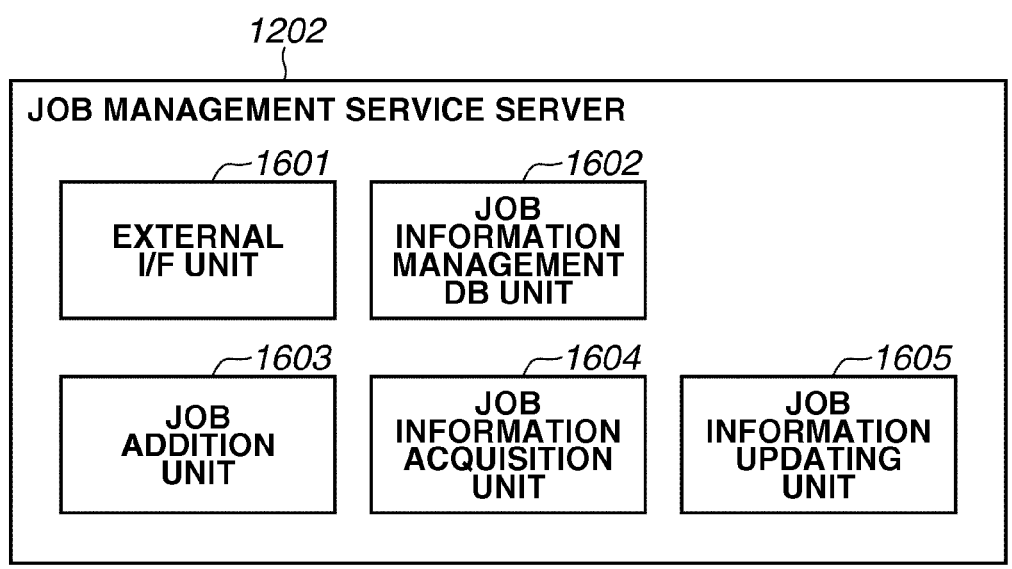
FIG. 16 illustrates a system configuration of a job management service server according to an embodiment of the present invention.

The job management service server 1202 in the flow service server 102 will be described below with reference to FIG. 16. Referring to FIG. 16, the job management service server 1202 is a service for receiving the task information in response to the request from the task service servers 103 and 104, and managing a status of each task. An external I/F unit 1601 communicates with the task service servers 103 and 104 and the image forming apparatus 107. The task service servers 103 and 104 and the image forming apparatus 107 thus access each of the functions in the temporary file management service server 1203 and the job service server 1202 via the external I/F unit 1601. A job information management DB unit 1602 manages the status of each of the generated jobs and the ID of the data processed in each job. FIG. 17 illustrates the detailed contents of the job information management DB unit 1602 which will be described below. In response to that the scan service server 101 issues a job input request via the external I/F unit 1601 in step S1109 illustrated in FIG. 11, a job addition unit 1603 stores the job information in the job information management DB unit 1602.

The job information includes the data in each of columns 1701 to 1707 illustrated in FIG. 17 in the job information management DB unit 1602. A job information acquisition unit 1604 receives the task acquisition request issued from the task service servers 103 and 104 via the external I/F unit 1601 in step S1110 illustrated in FIG. 11. The job information acquisition unit 1604 then acquires the job information from the job information management DB unit 1602. The acquired job information is transferred in step S1111 to the task service servers 103 and 104.

A job information updating unit 1605 receives in step S1116 the job information update request issued from the task service servers 103 and 104 via the external I/F unit 1601, and updates the job information in the job information management DB unit 1602. The information to be updated includes the current task ID 1704, the status 1705, and the last update date and time 1706 illustrated in FIG. 17. The job information updating unit 1605 acquires, before updating the current task ID 1704, the subsequent task ID in the route ID from the route information management DB unit 1301 via the external I/F unit 1303 in the route management service server 1201. The job information updating unit 1605 thus updates the current task ID 1704 using the acquired task ID. The job information updating unit 1605 also updates the status 1705 to zero (0) and the last update date and time 1706 to the current date and time.

The data stored in the job information management DB unit 1602 will be described below with reference to FIG. 17. Referring to FIG. 17, the job ID 1701 is the ID uniquely assigned to each of the job information. The route ID 1702 stores the route ID corresponding to the template selected in the ticket generation screen 601 illustrated in FIG. 6. The file group ID 1703 is issued from the temporary file management service server to be described below.

The current task ID 1704 is the task ID indicating the task to be processed in the job. The task service servers 103 and 104 confirms the current task ID 1704, selects the row including the task ID which is the same as the task ID assigned to the task service servers 103 and 104, and performs processing. Upon completing task processing, the job information updating unit 1605 updates the task ID to the task ID of the subsequent task in the route ID.

A value indicating "waiting to be processed (i.e., 0)", "processing (i.e., 1)", or "error (i.e., 2)" is set to the status 1705. The task service servers 103 and 104 select the row in which the status 1705 is "1". Accordingly, it prevents a plurality of task service servers from performing the same task.

After selecting the job, the task service servers 103 and 104 updates the status 1705 to "1" using the job information updating unit 1605 via the external I/F unit 1601. The last update date and time 1706 is updated when the task service servers 103 and 104 have executed some sort of process with respect to the job. Some sort of process includes, for example, a status update process and a job acquisition process.

If there is a plurality of job information which is the same as the task ID of the task service servers 103 and 104 when the task service servers 103 and 104 is to acquire a job, the task service servers 103 and 104 select the job whose last update date and time 1706 is the oldest. Accordingly, all jobs can be evenly performed. The parameters 1707 describe the setting information specified in the detailed setting screen 606, and the setting information which the task service servers 103 and 104 transmit to other task service servers 103 and 104. The parameters 1707 also describe the access token used by the specific task.

The temporary file management service server 1203 is a service which stores files according to requests from the scan service server 101 and the task service servers 103 and 104, and manages a path to a storage destination of the files. In addition, when there is a file acquisition request from the task service servers 103 and 104, the temporary file management service server 1203 returns binary data of the stored file to the task service servers 103 and 104. Further, if there is a request from the task service servers 103 and 104 or the job management service server 1202 to delete the file, the temporary file management service server 1203 deletes the stored file. The scan service server 101 and the task service servers 103 and 104 can thus store, acquire, and delete the files using the temporary file management service server 1203, regardless of the path to the file storage destination and the status of the file server.

Figure 18:
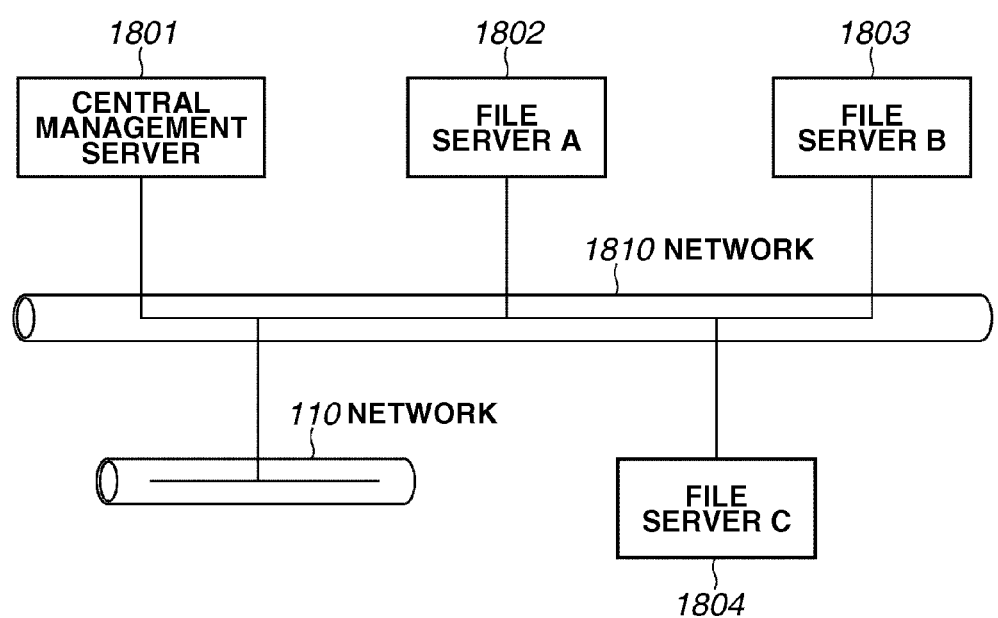
FIG. 18 illustrates an entire configuration of a temporary file management service server according to an embodiment of the present invention.

The temporary file management service server 1203 will be described below with reference to FIGS. 18, 19, 20, and 21. FIG. 18 illustrates the entire configuration of the temporary file management service server 1203. Referring to FIG. 18, a central management server 1801, a file server A 1802, a file server B 1803, and a file server C 1804 are connected with each other via a network 1810. Further, the network 1810 is connected to the network 110. The network 1810 is a communication network capable of transmitting and receiving the data similarly as the network 110. The central management server 1801 is generally executed on the server computer. The file servers 1802, 1803, and 1804 are also generally executed on the server computer, and include the functions for storing, deleting, and acquiring electronic data as necessary.

Figure 19:
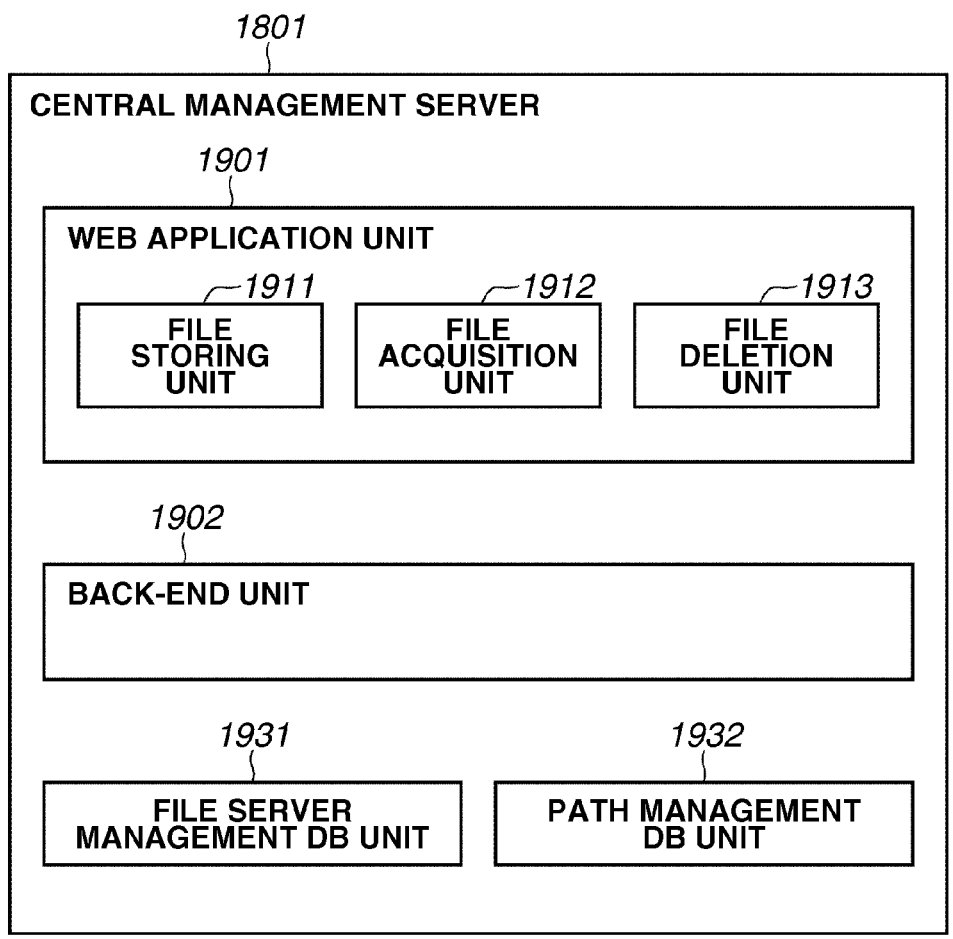
FIG. 19 illustrates a system configuration of a central management server according to an embodiment of the present invention.
Figure 21:
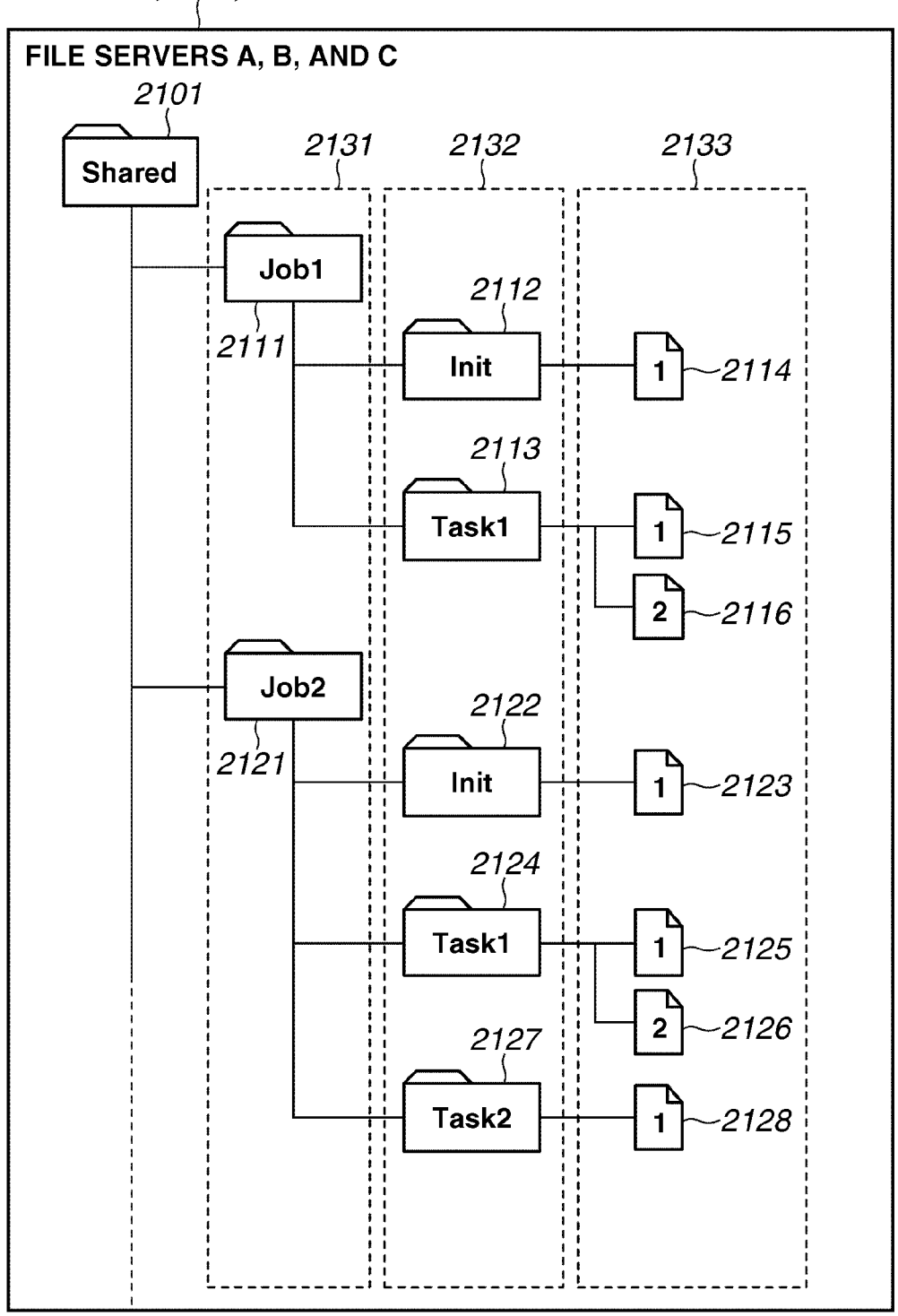
FIG. 21 illustrates a hierarchical structure of a folder in a file server used in the temporary file management service server according to an embodiment of the present invention.

The central management server 1801 which provides a temporary file management function will be described below with reference to FIGS. 19, 20, and 21. FIG. 19 illustrates the system configuration of the central management server 1801 according to this embodiment of the present invention. Referring to FIG. 19, the central management server 1801 includes a web application unit 1901, a back-end unit 1902, a file server management DB unit 1931, and a path management DB unit 1932. The central management server 1801 performs the service by each of the components performing the various processes. The web application unit 1901 is the web application program which provides the temporary file management function. Each of the functions will be described below. The back-end unit 1902 realizes the functions for storing, acquiring, and deleting the files in the file servers 1802, 1803, and 1804 illustrated in FIG. 18. The file server management DB unit 1931 and the path management DB unit 1932 manage the data for realizing the temporary file management function.

The file server management DB unit 1931 manages the information related to the file servers 1802, 1803, and 1804 which are the file storage destination. FIG. 20 illustrates an example of the data pieces managed by the file server management DB unit 1931. Referring to FIG. 20, an ID 2001 is the information for uniquely identifying the file server in the temporary file management service server 1203. A host name 2002 indicates a unique address of the file server on the network 1810, and is used when the web application unit 1901 accesses the file servers 1802, 1803, and 1804 via the back-end unit 1902. An active flag 2003 indicates a value of true or false indicating whether the web application unit 1901 can communicate via the back-end unit 1902 with the file server existing at the address indicated by the host name 2002. If the web application unit 1901 can communicate with the file server, the value is "True", and if the web application unit 1901 cannot communicate with the file server, the value is "False". A shared folder name 2004 indicates the name of the shared folders generated on the file servers 1802, 1803, and 1804. A full path of the shared folders generated in the file servers 1802, 1803, and 1804 can be acquired from the host name 2002 and the shared folder name 2004.

The path management DB unit 1932 manages the information related to the temporary files and the folders stored in the file servers 1802, 1803, and 1804 managed by the temporary file management service server 1203. According to this embodiment of the present invention, the files and the folders managed by the temporary file management service server 1203 are collectively referred to as an entity. FIG. 20 illustrates an example of the data pieces managed in the path management DB unit 1932. A file ID 2010 is the information for uniquely identifying the entity in the file servers 1802, 1803, and 1804. A file group ID 2011 is the information for grouping each of the entities by the related job. The entities generated by the same job thus have the same file group ID 2011.

A task ID 2012 indicates either the task ID of the task related to each entity, "Folder" indicating the folder, or "init" indicating the file stored by the request from the scan service server 101. According to this embodiment of the present invention, the file stored by the request from the scan service server 101 is referred to as initial data. A number 2013 indicates the file number of the file generated by each task. A path 2014 indicates the full path to the storage destination of the entity, used by the web application unit 1901 when accessing the entity via the back-end unit 1902. A host name 2015 indicates the host name of the file server storing each entity. A creation date 2016 and an expiration date 2017 indicate the creation date and the expiration date of each entity.

The file servers 1802, 1803 and 1804 store the files to be managed by the temporary file management service server 1203. FIG. 21 illustrates a hierarchical structure of the folders in the file servers 1802, 1803, and 1804. Referring to FIG. 21, a folder 2101 is a shared folder, which can be accessed by the web application unit 1901 via the back-end unit 1902. At least one shared folder 2101 exists in each server, and matches the shared folder name 2004 in the file server management DB unit 1931 illustrated in FIG. 20. According to this embodiment of the present invention, a depth of the shared folder 2101 is "0". The folder names of each of folders 2111 and 2121 in a folder group 2131 of depth "1" directly under the shared folder 2101 correspond to the file group ID 2011 in the path management DB unit 1932. Further, the folder names of each of folders 2112, 2113, 2122, 2124, and 2127 in a folder group 2132 of depth two directly under the folders 2111 and 2121 correspond to the task ID 2012 in the path management DB unit 1932. The temporary files managed by the temporary file management service server 1203 are stored directly under a folder group 2133 of depth two, and the file names correspond to the Number 2013.

Each of the functions included in the web application unit 1901 illustrated in FIG. 19 will be described below. A file storing unit 1911 realizes a function for multiplexing and storing the files in the file servers 1802, 1803, and 1804 according to the requests from the scan service server 101 and the task service servers 103 and 104. An integer which is greater than or equal to "1" can be designated as a multiplicity from the scan service server 101 and the task service servers 103 and 104, i.e., calling sources. If the multiplicity is "1", it is equivalent to storing the files without multiplexing. Further, the maximum value of the multiplicity is the number of the shared folders in the file servers 1802, 1803, and 1804, and any value greater than such a value is ignored. Furthermore, the initial data of the designated multiplicity is stored in the file servers, in order from the file server including the minimum number of folders in the folder group 2131 of depth "1" illustrated in FIG. 20. This is to equalize the capacities of the file servers 1802, 1803, and 1804.

When the file storing unit 1911 receives the request from the scan service server 101 and the task service servers 103 and 104, the file storing unit 1911 determines the file server to be the storing destination based on the multiplicity included in the request. In the case of the initial data, the storing destination file server is determined from the arbitrary file servers currently being activated. If the data is not the initial data, the storing destination file server is determined from the file servers in which the initial data is stored. Upon determining the storing destination file server, the path to the storing destination of the file is determined based on the file group ID, the task ID, and the Number, and a file storing process is then executed.

In the file storing process, the file storing unit 1911 transmits to the back-end unit 1902 the storing destination file path and the binary data of the file. The back-end unit 1902 confirms whether communication can be performed with the storing destination file server. If communication can be performed with the storing destination file server, the file is stored in the storing destination file path. If the files are to be multiply-stored, the above-described process is repeated the number of times indicated by the multiplicity. Upon storing all the files, the back-end unit 1902 returns the result to the file storing unit 1911. If the files are successfully stored, the file storing unit 1911 adds to the path management DB unit 1932 the entry on the storing destination file path.

A file acquisition unit 1912 returns to the task service servers 103 and 104 the files stored in the file servers 1802, 1803, and 1804 according to the request from the task service servers 103 and 104. More specifically, upon receiving the request from the task service servers 103 and 104, the file acquisition unit 1912 makes an inquiry to the path management DB unit 1932 based on the file group ID, the task ID, and the number included in the request, and acquires the storing destination file path. The file acquisition unit 1912 then transmits to the back-end unit 1902 the storing destination file path. The back-end unit 1902 confirms whether communication can be performed with the storing destination file server. If communication can be performed, the back-end unit 1902 returns to the file acquisition unit 1912 the binary data of the file. The file acquisition unit 1912 then returns to the task service servers 103 and 104 the binary data returned from the back-end unit 1912.

A file deletion unit 1913 deletes the entity stored in the file servers 1802, 1803, and 1804 according to the requests from the task service servers 103 and 104 and the job management service server 1202. Upon receiving the request from the task service servers 103 and 104 and the job management service server 1202, the file deletion unit 1913 makes an inquiry to the path management DB unit 1932 based on the file group ID, the task ID, and the Number included in the request. The file deletion unit 1913 then transmits to the back-end unit 1902 the acquired entity path to the storing destination. The back-end unit 1902 confirms whether communication can be performed with the storing destination file server. If communication can be performed, the back-end unit 1902 deletes the entity. Upon completing deletion of the entity, the back-end unit 1902 returns the result to the file deletion unit 1913. If deletion of the entity is successful, the file deletion unit 1913 deletes from the path management DB unit 1932 the entry on the deleted entity.

Figure 22B:
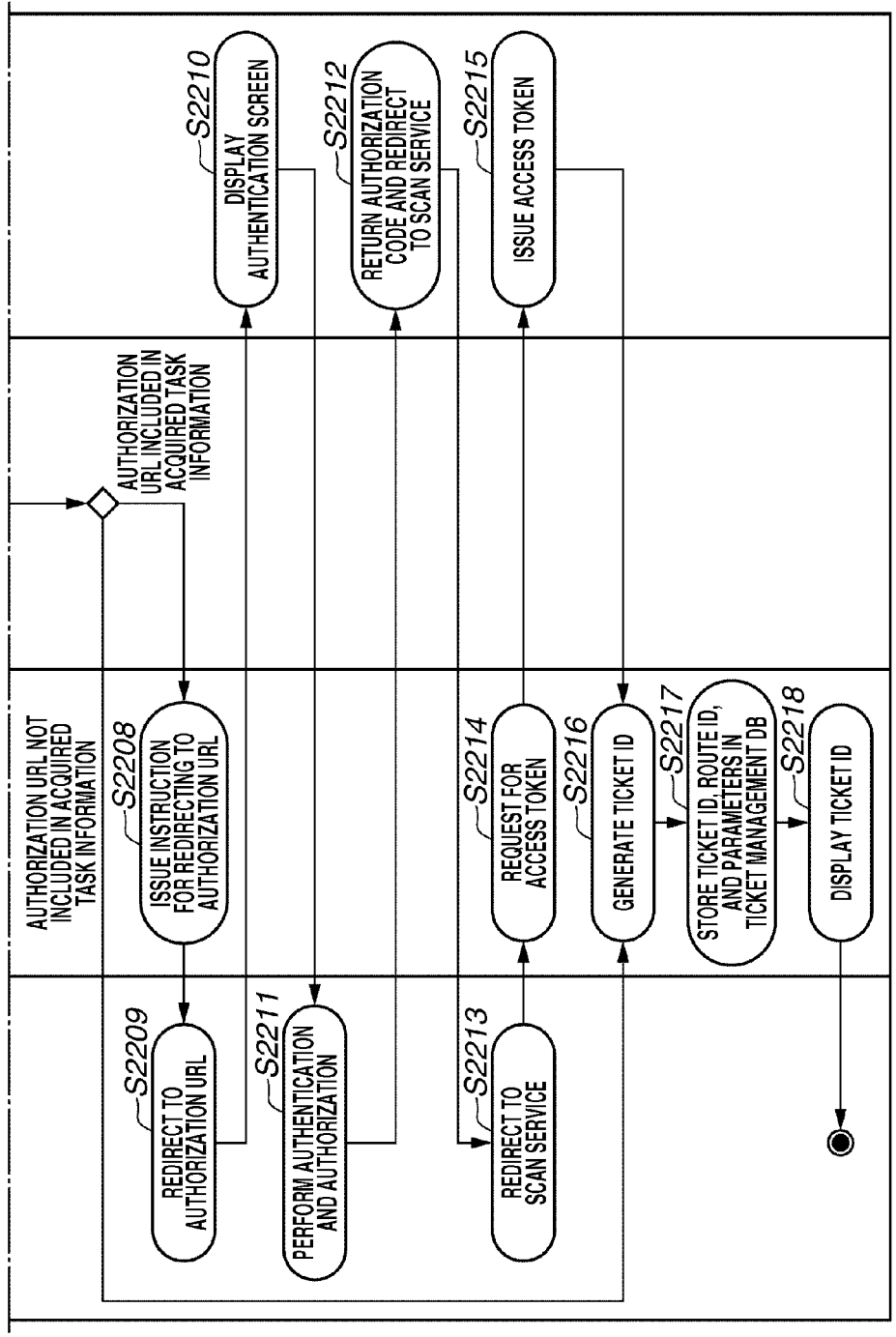
FIG. 22 (including FIGS. 22A and 22B) is a flowchart illustrating a process performed when selecting a scan ticket according to an embodiment of the present invention.
Figure 23:
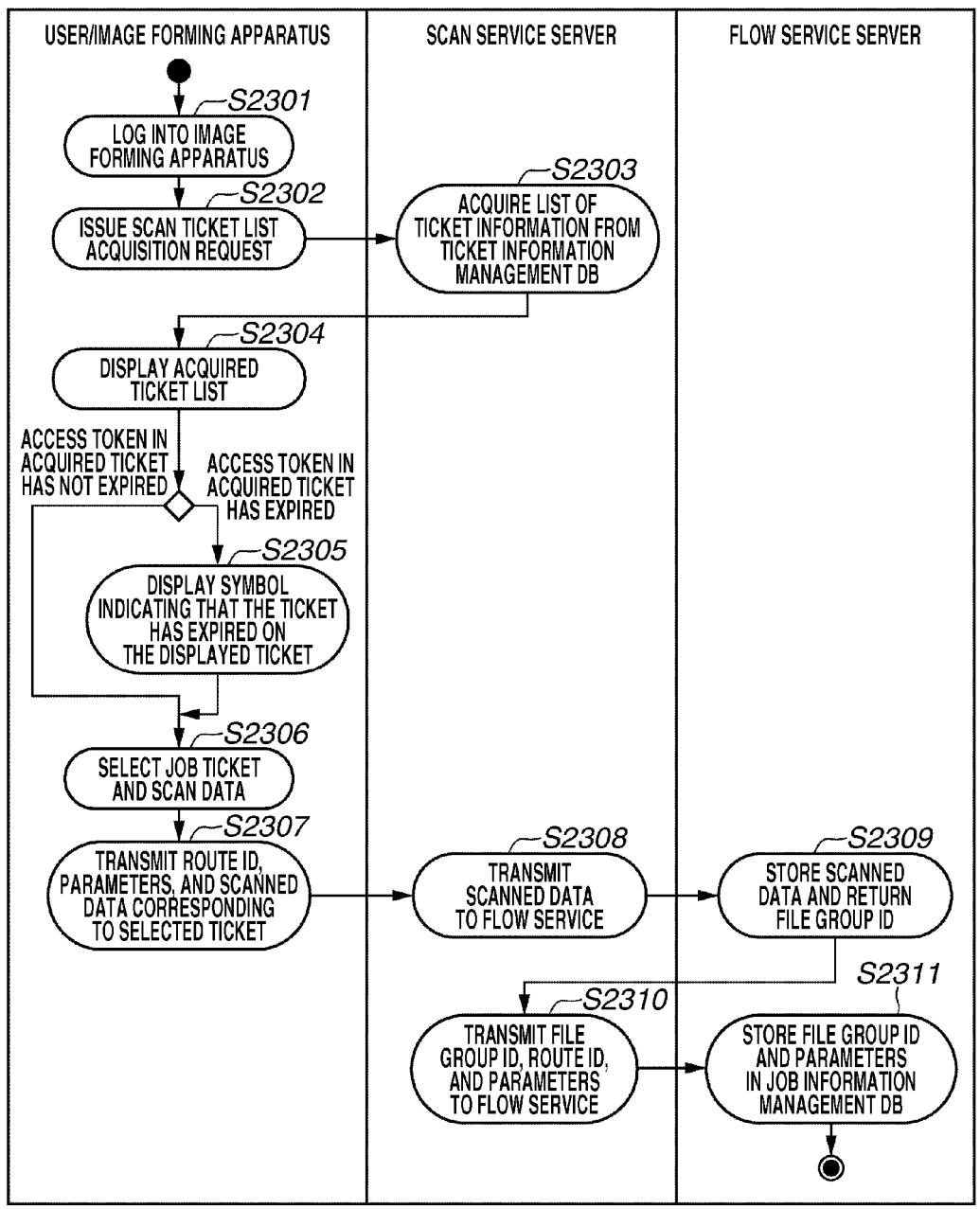
FIG. 23 is a flowchart illustrating a scanning operation performed in the image forming apparatus according to an embodiment of the present invention.
Figure 24:
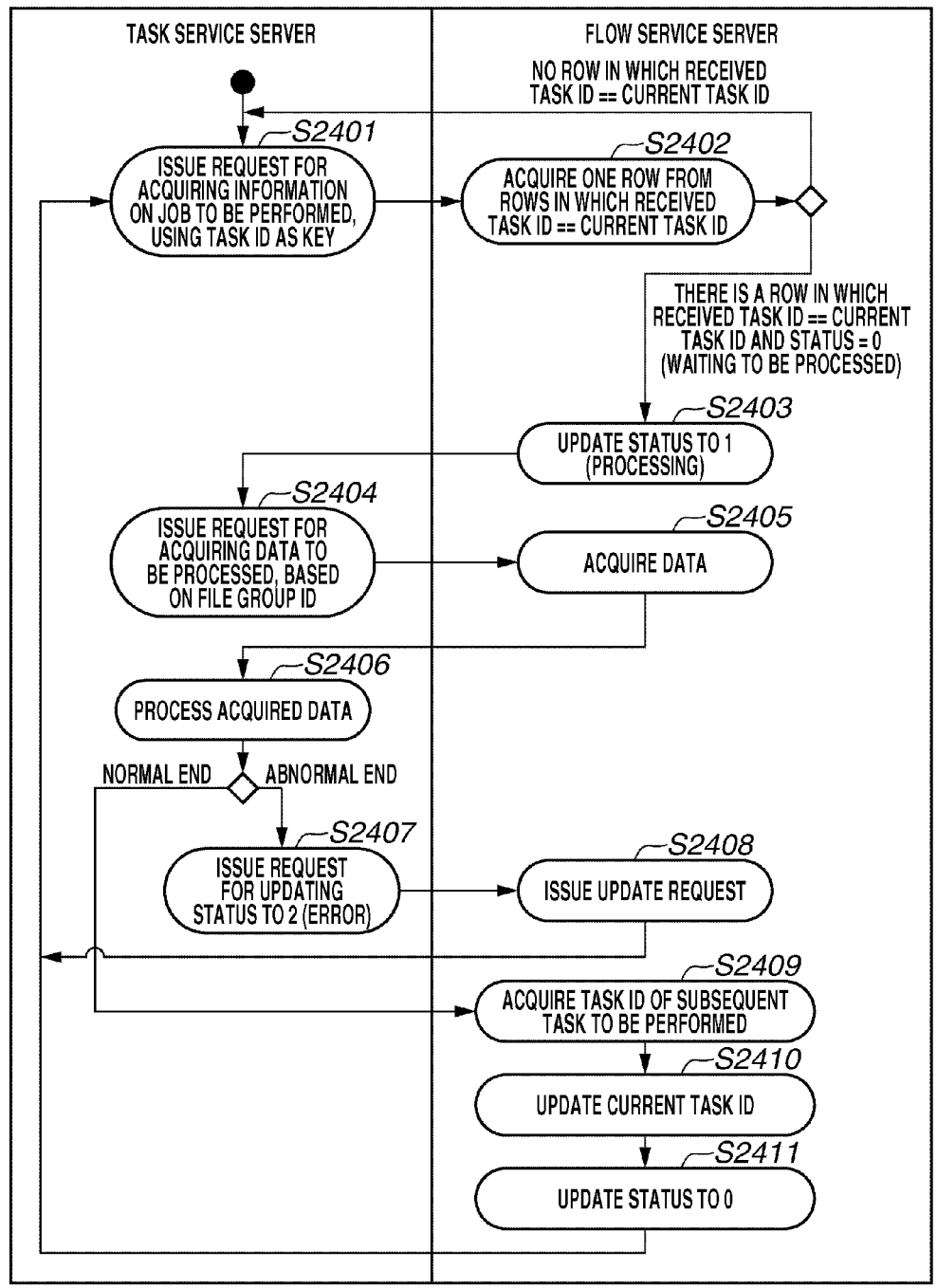
FIG. 24 is a flowchart illustrating a process performed in the task service server according to an embodiment of the present invention.

A ticket generation process on the ticket generation screen 601, the operation on the image forming apparatus 107, and the process flow in the task service servers 103 and 104 according to this embodiment of the present invention will be described below with reference to FIGS. 22, 23, and 24. The process performed when selecting the scan ticket on the ticket generation screen 601 will be described below with reference to FIG. 22 (including FIGS. 22A and 22B).

In step S2201, the user logs into the scan service server 101 via the browser. In step S2202, the scan service server 101 acquires a template list from the flow service server 102 and displays the list on the client terminal 106. In step S2203, the user selects via the browser the template displayed on the client terminal 106. If it is necessary to specify detailed settings on the selected template, the process proceeds to step S2204. If it is not necessary to specify the detailed settings, the process proceeds to step S2205.

In step S2204, the user specifies via the browser, the various settings on the detailed setting screen 605 illustrated in FIG. 6. In step S2205, the user presses via the browser the ticket issue button 606 displayed on the scan ticket generation screen 601, so that the browser transmits the scan ticket issue request to the scan service server 101.

In step S2206, the scan service server 101 identifies the route ID corresponding to the selected template, and issues to the flow service server 102 the request for acquiring the information of the task service server included in the route corresponding to the route ID. In step S2207, the flow service server 102 acquires from the task information management DB unit 1302 the information of the task service server included in the route corresponding to the designated ID, and transmits the result to the scan service server 101. The flow service server 102 then determines whether the authorization URL 1503 is included in the acquired information. If the authorization URL 1503 is included, the process proceeds to step S2208, and if the authorization URL 1503 is not included, the process proceeds to step S2216.

In step S2208, the scan service server 1101 issues to the browser in the client terminal 106 a redirect instruction to the authorization URL 1503. The authorization URL is the URL of the host of the web service for performing authentication and authorization of the external service with which the task service server is to cooperate. In step S2209, the client terminal 106 receives the redirect instruction issued in step S2208, and accesses the redirect destination (i.e., the destination indicated by the authorization URL).

In step S2210, the external service returns to the browser a response for displaying the authentication screen on the client terminal 106. In step S2211, the user inputs via the browser the user ID and the password with respect to the external service on the authentication screen displayed on the client terminal 106. If the user successfully logs into the external service, the user inputs via the authorization screen whether to permit the scan service server 101 to access the external service.

In step S2212, the external service issues to the client terminal 106 the redirect instruction to the URL of the scan service server 101. The instruction includes the character string referred to as an authorization code which is necessary for acquiring the access token. In step S2213, the client terminal 106 is redirected to the URL of the designated scan service server 101 according to the redirect instruction received in step S2212.

In step S2214, the scan service server 101 requests the external service for the access token using the authorization code embedded in the redirect instruction. In step S2215, the external service verifies the authorization code issued in step S2212, and if it is valid, the external service issues the access token to the scan service server 101. In this case, the external service issues the expiration date of the access token at the same time. The above-described processes from step S2208 to step S2215 are preferably realized by using OAuth 2.0 protocol.

In step S2216, the scan service server 101 generates the ticket ID. In step S2217, the scan service server 101 then stores in the ticket management DB unit 502 the ticket ID generated in step S2216, the route ID corresponding to the selected template, and the parameters. The parameters include the detailed settings of the scan ticket specified in step S2204, the access token and the expiration date thereof issued in step S2215. In step S2218, the scan service server 101 issues a command for displaying on the client terminal 106 the ticket ID generated in step S2216.

By performing the above-described process, if the template selected by the user includes the task service server that requires authentication and authorization for accessing the external service, the access token to the external service can be acquired. If the access token cannot be acquired due to a failure in the authentication process of the user, the scan service server does not issue the ticket, and the process ends. In such a case, a message indicating that the ticket cannot be generated may be transmitted to the device.

The series of processes performed from the user selecting the scan ticket on the image forming apparatus 107 will be described below with reference to FIG. 23. In step S2301, the user logs into the image forming apparatus 107 via a log-in UI of the image forming apparatus 107. In step S2302, the image forming apparatus 107 issues to the scan service server 101 the scan ticket list acquisition request. In step S2303, the scan service server 101 acquires from the ticket management DB unit 502 the list of the ticket information, and responds to the image forming apparatus 107. The response message includes the information in all of the columns illustrated in FIG. 7.

In step S2304, the image forming apparatus 107 displays on the UI the acquired ticket list. If the acquired ticket information includes the access token and the access token has expired, the process proceeds to step S2305, and the process proceeds to step S2306 for all other cases. The response message transmitted from the scan service server 101 in step S2303 does not necessarily include the information in all columns. For example, a ticket whose access token has expired is not necessary to be included in the ticket list, or a specific ticket may be omitted.

In step S2305, the image forming apparatus 107 displays the symbol indicating that the ticket has expired on top of the expired ticket displayed in step S2304. Accordingly, the user can determine that the access token of the ticket has expired. In addition, the expired ticket is set so as not to be selected by the user. In step S2306, the user selects the ticket displayed on the image forming apparatus 107 via the operation UI of the image forming apparatus 107, sets the document, and starts the scanning operation. In step S2307, the image forming apparatus 107 transmits to the scan service server 101 the route ID, the parameters, and the scanned data associated with the selected ticket.

In step S2308, the scan service server 101 transmits to the flow service server 102 the received scanned data. In step S2309, the flow service server 102 stores the received scanned data, and transmits the file group ID to the scan service server 101. In step S2310, the scan service server 101 transmits to the flow service server 102 the received file group ID, and the parameters and the route ID received from the image forming apparatus 107. In step S2311, the flow service server 102 stores in the job management DB unit 502 the received file group ID, route ID, and parameters. By performing the above-described process, the user can easily recognize that the access token has expired.

The process performed by the task service server will be described below with reference to FIG. 24. The task service server selects a job to be processed by itself from the data stored in the job management DB unit 1602, and processes the job based on the parameters 1707. The process will be described in detail below. In step S2401, the task service server issues to the flow service server 102 the request for acquiring the job information to which the task ID assigned to the task service server itself is set. The task ID may be described in the setting file in the task service server or assigned to the task service server as the fixed value.

In step S2402, the flow service server 102 confirms that there is a row in the job information which includes the current task ID 1704 that has the same value as the task ID designated in the job management DB unit 502. If there is no row including the same value, the process returns to step S2401. If there is a row including the same value and the status 1705 in the row is "0", the flow service server 102 selects the row. The process then proceeds to step S2403. In step S2403, the flow service server 102 changes the status 1705 included in the row selected in step S2402 to "1". Accordingly, the job is prevented from being selected by another task service server. In addition, the flow service server 102 transmits to the task service server the information of the updated row.

In step S2404, the task service server issues to the flow service server 102 the request for acquiring the scanned data to be processed, based on the file group ID 1703 included in the information acquired from the flow service server 102. In step S2405, the flow service server 102 acquires the scanned image data based on the designated file group ID, and transmits the acquired scanned image data to the task service server.

In step S2406, the task service server processes the acquired data. For example, the task service server performs an optical character recognition (OCR) analysis, image processing such as Joint Photographic Experts Group (JPEG) conversion, and data storage in Google (registered trademark). If the data in the job information acquired from the flow service server 102 stores the access token for accessing to the external service, the task service server uses the access token to access the external service. If the process normally ends, the process proceeds to step S2409. On the other hand, if the process abnormally ends, the process proceeds to step S2407.

In step S2407, the task service server issues to the flow service server 102 the request for updating the status 1705 of the job to "2 (error)". In step S2408, the flow service server 102 updates the status 1705 in the job information management DB unit 1602 to "2" according to the update request.

In step S2409, the flow service server 102 acquires the route ID from the job information management DB unit 1602, based on the job ID of the currently-processing job. Further, the flow service server 102 acquires the task ID of the subsequent task to be performed from the route information management DB unit 1301, based on the acquired route ID. In step S2410, the flow service server 102 updates the current task ID 1704 in the job information management DB unit 1602, using the task ID acquired in step S2409. In step S2411, the flow service server 102 updates the status 1705 to "0 (waiting to be processed)".

By performing the above-described process from step S2409 to step S2411, the task service server to perform the subsequent process can acquire the job information from the job information management DB unit 1602. Accordingly, the tasks can be performed according to a predetermined task execution order, and the task service server can operate the external service using the access token. In other words, according to the present embodiment, the access token required in performing the specific task can be acquired at an appropriate timing for smoothly executing the tasks in the system that connects the tasks to process a job.

A second embodiment according to the present invention will now be described. The only differences from the first embodiment will be described below. In the present embodiment, a process to be performed when a user selects a ticket whose access token has expired and starts job execution is included in addition to the process according to the first embodiment. According to the first embodiment, the user confirms the symbol displayed on the image forming apparatus 107 indicating that the access token has expired. The user thus recognizes that the access token has expired and performs a reacquisition operation. However, it is necessary for the user to activate the client terminal 106 and re-access the scan service server 101 to acquire the access token again. Therefore, the user is required to move back and forth between the image forming apparatus 107 and the client terminal 106, so that the user experience becomes poor.

According to the present embodiment, the user can select the ticket whose access token has expired and execute the job processing. More specifically, the task service server performs a task process to the process requiring the access token, and waits to execute the specific task until the user reacquires the access token. By performing the above-described process, the time required for the user to move back and forth between the image forming apparatus 107 and the client terminal 106 can be used for executing the tasks, and the job processing can be completed in a shorter time. Control may be performed so as to not display the symbol indicating that the access token has expired. If the user selects the ticket in such a state, the tasks prior to the specific task requiring the authentication token may be performed.

If the user does not re-input the access token and does not operate on the image forming apparatus 107 for a long period of time, the data to be used in the scanning process remains. To solve such an issue, an expiration date is set on the job, and if the job has expired, a screen prompting the user to extend the expiration date or delete the job is displayed every time the user logs into the image forming apparatus 107. Accordingly, the job can be prevented from remaining. FIG. 25 illustrates an example of the data pieces stored in the ticket management DB unit 502 according to the present embodiment. Referring to FIG. 25, an expiration date 2501 is added to the data in the ticket management DB unit 502 illustrated in FIG. 7. The expiration date 2501 is the expiration date of the scan ticket generated by the user. The expiration date may be a fixed value, or may be determined on the detailed setting screen 605 illustrated in FIG. 6.

Figure 26:
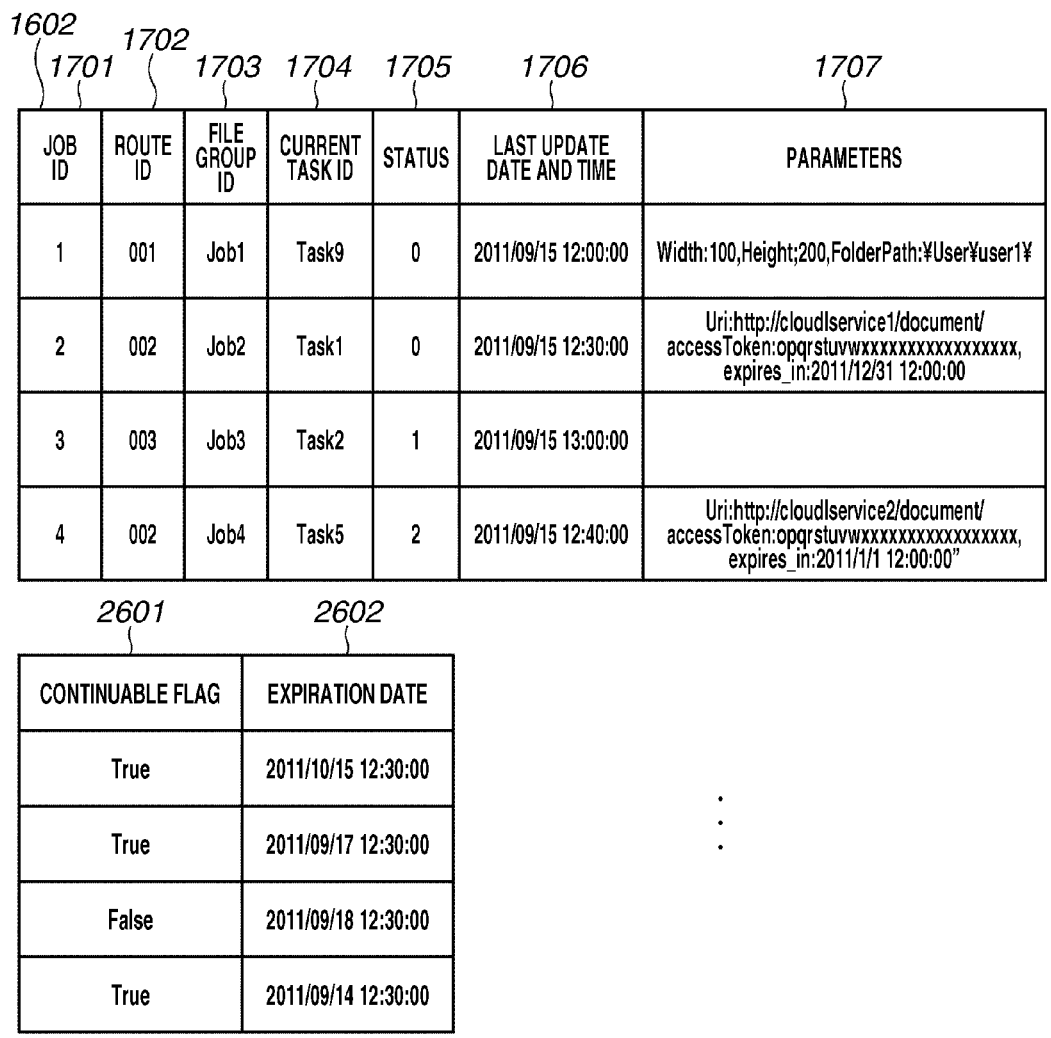
FIG. 26 illustrates an example of job information stored in a job management service server according to the second embodiment of the present invention.

FIG. 26 illustrates an example of the data pieces stored in the job information management DB unit 1602 according to the present embodiment. Referring to FIG. 26, a continuable flag 2601 and an expiration date 2602 are added to the job information management DB unit 1602 illustrated in FIG. 17. The continuable flag 2601 indicates whether the job can be performed. If the continuable flag 2601 is "True", the job is continuable, and if the continuable flag 2601 is "False", the job cannot be continued. If the task service server that requires authentication and authorization for accessing the external service acquires the information from the job management DB unit 502 and the access token has expired, the continuable flag 2601 is updated to False. Such a process will be described in detail below with reference to FIG. 28.

The task service server confirms the continuable flag 2601 before starting the process, and only performs the job whose continuable flag 2601 is "True". The process can thus be stopped before the task service server that requires the access token. In other words, if the task service server does not require the access token, the task can be performed even if the access token has expired, so that the performance of the system can be improved. The expiration date 2602 stores the same value as the expiration date 2501 in the ticket management DB unit 502.

Figure 27:
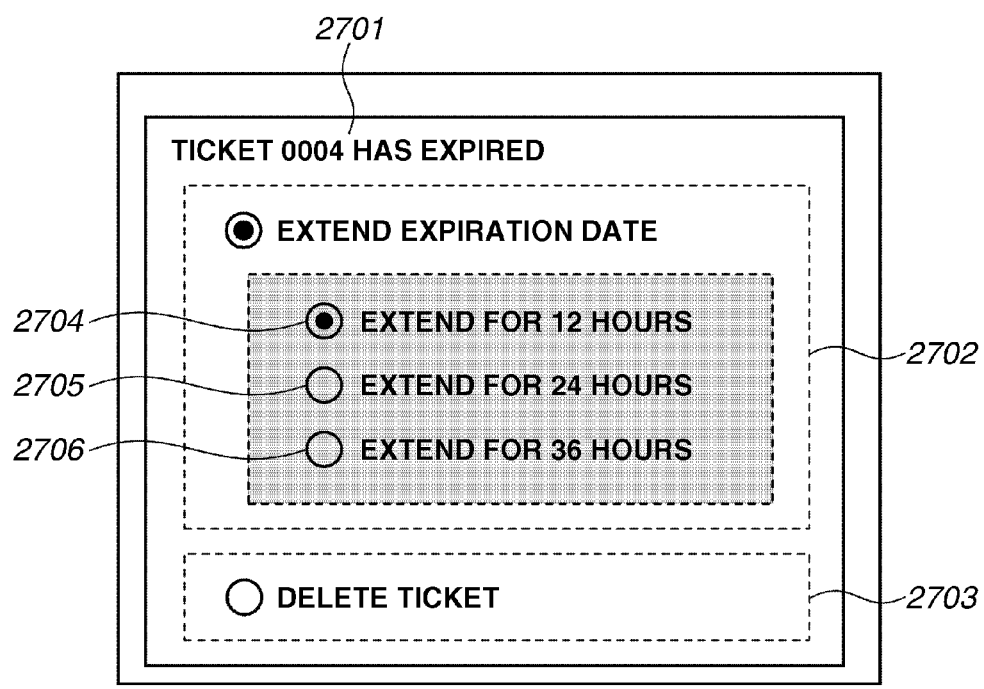
FIG. 27 illustrates a user interface of an image forming apparatus according to the second embodiment of the present invention.

FIG. 27 illustrates a message displayed on the image forming apparatus 107 when the ticket has expired. As described above, the screen is displayed every time the user logs into the image forming apparatus 107 to prevent the expired job from being left unattended for a long time. The image forming apparatus 107 acquires the expiration date when acquiring the ticket list form the ticket management DB unit 502. If there is an expired ticket, the screen illustrated in FIG. 27 is displayed.

Referring to FIG. 27, the screen includes a message 2701 notifying that the expiration date has passed, an area 2702 for the user to extend the expiration date, and an area 2703 for deleting the ticket. The example illustrated in FIG. 27 displays as extension periods of the expiration date, "12 hours" 2704, "24 hours" 2705, and "36 hours" 2706. However, the value is not limited to these three values, and the extension periods may be longer. If the user selects extending the expiration date, the screen on the image forming apparatus 107 changes to the ticket selection screen illustrated in FIG. 9. Further, if the user selects to delete the ticket, the screen in which the ticket is deleted from the ticket list illustrated in FIG. 9 is displayed.

Figure 28:
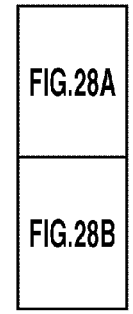
FIG. 28 (including FIGS. 28A and 28B) is a flowchart illustrating a process performed in a task service server according to the second embodiment of the present invention.
Figure 28A:
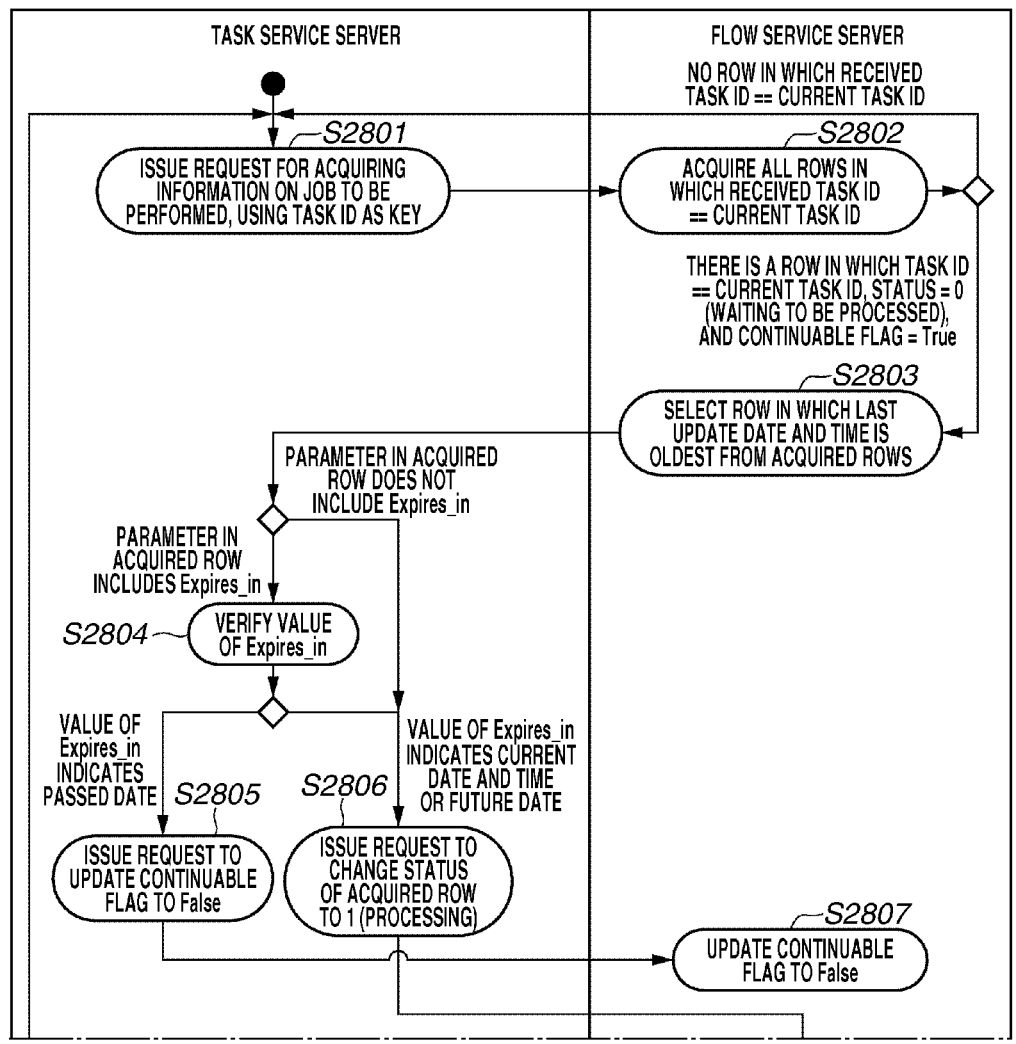
Figure 28B:
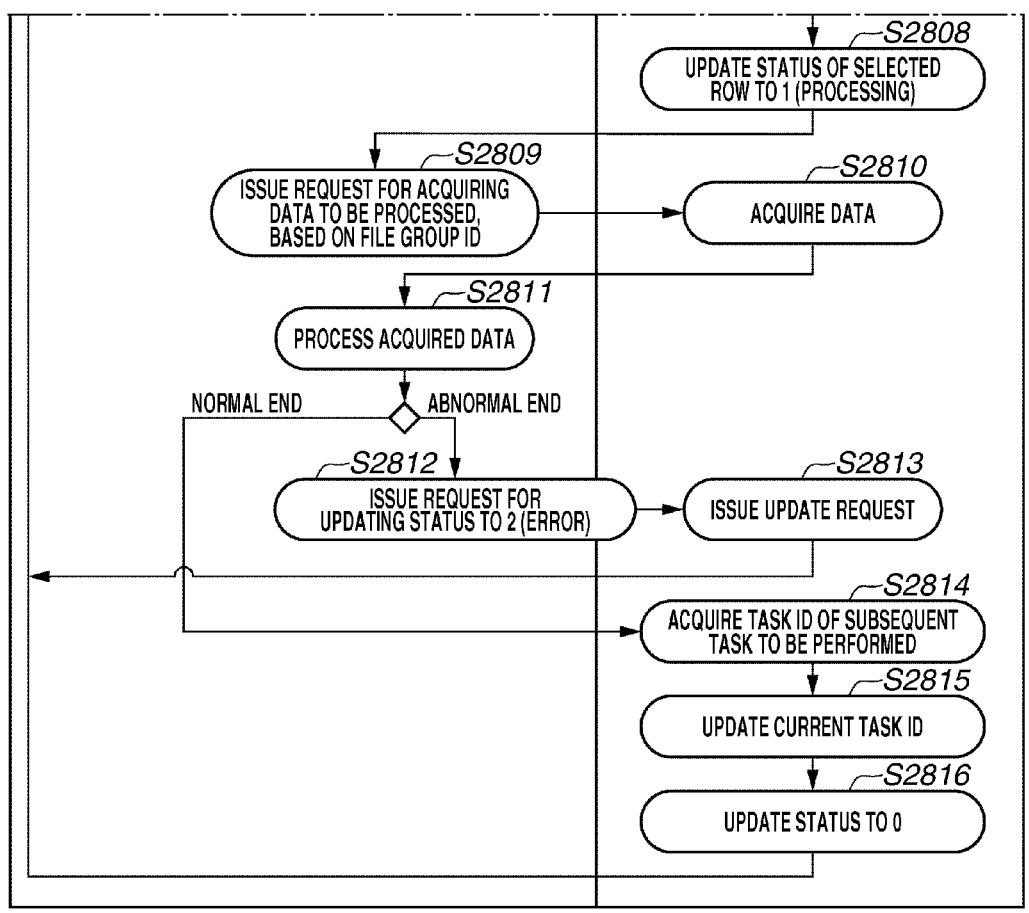
Figure 29:
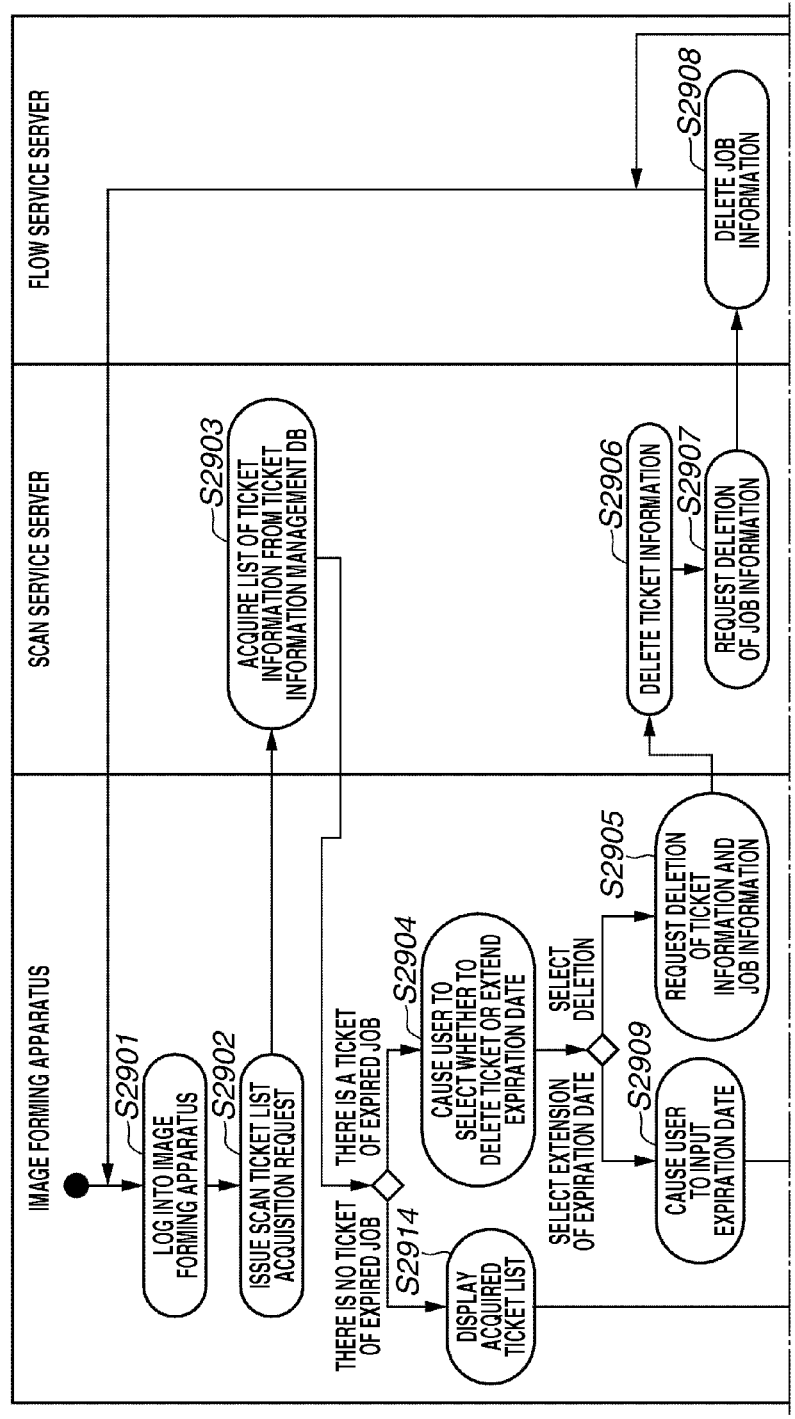
FIG. 29 (including FIGS. 29A and 29B) is a flowchart illustrating a scanning operation performed in the image forming apparatus according to the second embodiment of the present invention.

The processes performed by the task service server and the image forming apparatus 107 according to the present embodiment will be described below with reference to FIGS. 28 and 29. The process performed by the task service server in the case where the expiration date of the job has expired will be described below with reference to FIG. 28 (including FIGS. 28A and 28B). In step S2801, the task service server issues to the flow service server 102 the request for acquiring the job information including the task ID assigned to the task services server itself. The task ID may be described in the setting file in the task service server or assigned to the task service server as the fixed value.

In step S2802, the flow service server 102 confirms that there is a row in the job information which includes the current task ID 1704 that includes the same value as the task ID designated in the job management DB unit 502. If there is no row including the same value, the process returns to step S2801. If there is a row including the same value, the status 1705 in the row is "0", and the value of the continuable flag 2601 is "True", the flow service server 102 selects the row, and the process proceeds to step S2803. The process returns to step S2801 for all other cases.

In step S2803, the flow service server 102 selects from the rows selected in S2802, the row in which the last update date and time 1706 is the oldest. Accordingly, the job that has been generated the earliest is performed first. If the expiration date (i.e., "expires_in") of the access token is included in the parameters 1707 of the selected row, the process proceeds to step S2804. If the expiration date is not included, the process proceeds to step S2806.

In step S2804, the task service server compares the value of "expires_in" with the current date and time. If the value of the "expires_in" is a passed date (i.e., the expiration date of the access token has expired), the process proceeds to step S2805. On the other hand, if the value of the "expires_in" is the current date and time or a future date, the process proceeds to step S2806. In step S2805, the task service server issues to the flow service server 102 a request for changing the continuable flag 2601 of the job being performed to "False". In step S2806, the task service server issues to the flow service server 102 a request for updating the status 1705 of the job being performed to "1 (processing)".

In step S2807, the flow service server 102 receives the request issued from the task service server to update the continuable flag 2601, and updates the continuable flag 2601 in the job information management DB unit 1602 accordingly. In step S2808, the flow service server 102 receives the request issued from the task service server to update the status 1705, and updates the status in the job information management DB unit 1602 accordingly. Since the processes in step S2809 and thereafter are the same as the processes in step S2404 and thereafter illustrated in FIG. 24, description thereof will be omitted.

Figure 29B:
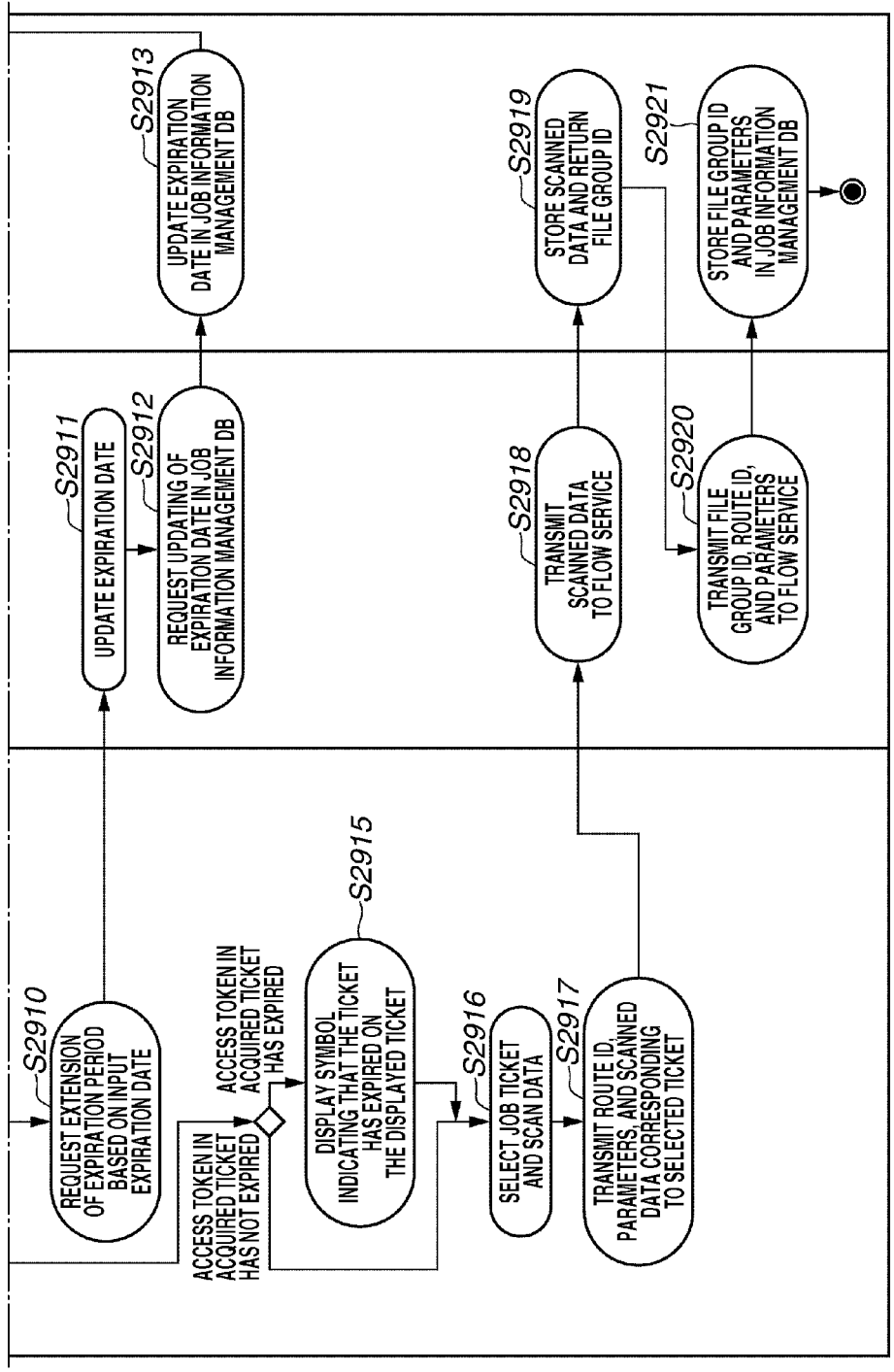

The process performed for inputting the expiration date and deleting the job on the image forming apparatus 107 will be described below with reference to FIG. 29 (including FIGS. 29A and 29B). In step S2901, the user logs into the image forming apparatus 107. In step S2902, the image forming apparatus 107 issues the scan ticket list acquisition request to the scan service server 101. In step S2903, the scan service server 101 acquires the ticket information list from the ticket management DB unit 502 and responds to the image forming apparatus 107. The response message includes the information in all columns illustrated in FIG. 25.

The image forming apparatus 107 then verifies the expiration date 2501 included in the response message. If there is a message indicating that the expiration date is earlier than the current date and time (i.e., the expiration date has passed), the process proceeds to step S2904. Whereas if the expiration date is later than the current date and time (i.e., the expiration date has not passed), the process proceeds to step S2914.

In step S2904, the image forming apparatus 107 displays the screen illustrated in FIG. 27 prompting the user to extend the expiration date or delete the ticket. If the user selects to extend the expiration date, the process proceeds to step S2909. If the user selects to delete the ticket, the process proceeds to step S2905. In step S2905, the image forming apparatus 107 issues to the scan service server 101 the request for deleting the ticket stored in the ticket information management DB unit 502 and the job information stored in the job information management DB unit 1602.

In step S2906, the scan service server 101 deletes the ticket information in the ticket information management DB unit 502 according to the ticket deletion request transmitted from the image forming apparatus 107. In step S2907, the scan service server 101 transmits to the flow service server 102 the job deletion request transmitted from the image forming apparatus 107. In step S2908, the flow service server 102 deletes the job information in the job information management DB unit 1602 according to the job deletion request transmitted from the scan service server 101.

In step S2909, the user selects from the extension periods of the expiration date displayed on the image forming apparatus 107 the desired extension period of the expiration date. In step S2910, the image forming apparatus 107 issues to the scan service server 101 the ticket input in S2909 and a request for extending the expiration date of the job.

In step S2911, the scan service server 101 receives the expiration date extension request transmitted from the image forming apparatus 107, and updates the expiration date 2501 in the ticket information management DB unit 502. In step S2912, the scan service server 101 issues to the flow service server 102 the job expiration date extension request, based on the expiration date extension request received from the image forming apparatus 107.

In step S2913, the flow service server 102 updates the expiration date 2602 in the job information management DB unit 1602 based on the expiration date extension request issued from the scan service server 101. Since the processes in step S2914 and thereafter are the same as the processes in step S2304 and thereafter illustrated in FIG. 23, description thereof will be omitted.

By performing the above-described process, the task service server performs the tasks to the process requiring the access token. The specific task is kept waiting until the user reacquires the access token, so that the system performance can be improved. Further, the user is prompted to recognize that there is a job which has expired, so that it can prevent a job which is not to be performed from remaining.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to embodiments, it is to be understood that the invention is not limited to the described embodiments.

This application claims priority from Japanese Patent Application No. 2011-250851 filed Nov. 16, 2011, which is hereby incorporated by reference herein in its entirety.

What is claimed is:

1. A system for processing an imaging job by connecting a plurality of tasks, wherein each task performs a specified process, and by sequentially executing each task, the system comprising:
    a processor coupled to a memory;
    a transmission unit configured to transmit, to a device and in a case where an instruction to generate a specific job requiring connection of a specific task that accesses a third party system providing a third party service is issued by the system, a redirect instruction to access the third party system;
    a storing unit configured to store an access token issued in response to an instruction received by the system from a user to permit access by the device to the third party system specified in the redirect instruction;
    an execution unit configured to execute a scanning process specified in the specific task by accessing the third party system using the stored access token and using the third party service and to determine an expiration date of the access token after verifying an authorization code embedded in the redirect instruction, wherein, in a case where the expiration date of the access token is passed when the specific job is processed, the execution unit is configured to permit a user to extend the expiration date of the access token and restart the execution of each task for processing the specific job connected before the specific task is started and wherein the specific task requires the access token as a key stored in parameters as a group that identifies the access token associated with a ticket;
    a confirmation unit configured to confirm whether the expiration date of the stored access token has passed in a case where a job selection screen for instructing start of the specific job is transmitted after the access token is stored in the storing unit; and
    a second transmission unit configured to transmit, in response to the confirmation that the expiration date of the access token has passed, the job selection screen on which a symbol indicating that the access token has expired is displayed with respect to a job requiring connection of the specific task using the access token, wherein at least one of the transmission unit, the storing unit, and execution unit are implemented by the processor.

2. The system according to claim 1 further comprising a user interface unit configured to provide a generation screen for generating a job to be processed and an authorization screen for inquiring whether to permit access to the third party system based on the redirect instruction, wherein the instruction to generate a specific job is generated by user input to the generation screen and the instruction to permit access to the third party system is generated by user input to the authorization screen.

3. The system according to claim 2, wherein the generation screen is a screen for generating a scan ticket, and a specific job is generated in a case where a ticket template displayed on the generation screen is selected and parameters related to a scan setting are input.

4. The system according to claim 3, wherein the execution unit is configured so that execution of the task is started in a case where the job selection screen is transmitted to an image processing apparatus including a scanner unit, a job is selected on the job selection screen, and scanned image data acquired by the image forming apparatus performing scanning is received.

5. The system according to claim 2, further comprising a management unit configured to manage a specific job generated via the generation screen by associating the specific job with the access token stored by the storing unit, and, in a case where the specific job is started, the specific task of the specific job executes a process specified using the access token associated with the specific job.

6. A method for controlling a system for processing an imaging job by connecting a plurality of tasks, wherein each task performs a specified process, and by sequentially executing each task, the method comprising:
    transmitting, to a device and in a case where an instruction to generate a specific job requiring connection of a specific task that accesses a third party system providing a third party service is issued by the system, a redirect instruction to access the third party system;
    storing an access token issued in response to an instruction received by the system from a user to permit access by the device to the third party system specified in the redirect instruction;
    executing a scanning process specified in the specific task by accessing the third party system using the stored access token and using the third party service and determining an expiration date of the access token after verifying an authorization code embedded in the redirect instruction, wherein, in a case where the expiration date of the access token is passed when the specific job is processed, executing includes permitting a user to extend the expiration date of the access token and restart the execution of each task for processing the specific job connected before the specific task is started and wherein the specific task requires the access token as a key stored in parameters as a group that identifies the access token associated with a ticket;

confirming whether the expiration date of the stored access token has passed in a case where a job selection screen for instructing start of the specific job is transmitted after the access token is stored; and transmitting, in response to the confirmation that the expiration date of the access token has passed, the job selection screen on which a symbol indicating that the access token has expired is displayed with respect to a job requiring connection of the specific task using the access token.

7. A non-transitory computer readable medium storing a program to cause a computer to perform a method for controlling a system for processing an imaging job by connecting a plurality of tasks, wherein each task performs a specified process, and sequentially executing each task, the method comprising:

transmitting, to a device and in a case where an instruction to generate a specific job requiring connection of a specific task that accesses a third party system providing a third party service is issued by the system, a redirect instruction to access the third party system;

storing an access token issued in response to an instruction received by the system from a user to permit access by the device to the third party system specified in the redirect instruction;

executing a scanning process specified in the specific task by accessing the third party system using the stored access token and using the third party service and determining an expiration date of the access token after verifying an authorization code embedded in the redirect instruction, wherein, in a case where the expiration date of the access token is passed when the specific job is processed, executing includes permitting a user to extend the expiration date of the access token and restart the execution of each task for processing the specific job connected before the specific task is started and wherein the specific task requires the access token as a key stored in parameters as a group that identifies the access token associated with a ticket;

confirming whether the expiration date of the stored access token has passed in a case where a job selection screen for instructing start of the specific job is transmitted after the access token is stored; and transmitting, in response to the confirmation that the expiration date of the access token has passed, the job selection screen on which a symbol indicating that the access token has expired is displayed with respect to a job requiring connection of the specific task using the access token.

* * * * *